(12) United States Patent
Hu et al.

(10) Patent No.: US 11,711,765 B2
(45) Date of Patent: Jul. 25, 2023

(54) METHOD AND APPARATUS FOR TRANSMITTING INDICATION SIGNALING, METHOD AND APPARATUS FOR RECEIVING INDICATION SIGNALING, NETWORK SIDE DEVICE, AND USER EQUIPMENT

(71) Applicants: China Mobile Communication Co., Ltd Research Institute, Beijing (CN); China Mobile Communications Group Co., Ltd., Beijing (CN)

(72) Inventors: Lijie Hu, Beijing (CN); Tuo Yang, Beijing (CN); Xueying Hou, Beijing (CN); Liang Xia, Beijing (CN); Xiaodong Xu, Beijing (CN); Qixing Wang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 47 days.

(21) Appl. No.: 17/271,770

(22) PCT Filed: Jul. 16, 2019

(86) PCT No.: PCT/CN2019/096082
§ 371 (c)(1),
(2) Date: Feb. 26, 2021

(87) PCT Pub. No.: WO2020/042783
PCT Pub. Date: Mar. 5, 2020

(65) Prior Publication Data
US 2021/0337471 A1    Oct. 28, 2021

(30) Foreign Application Priority Data

Aug. 31, 2018  (CN) .......................... 201811010219.4
Jan. 10, 2019  (CN) .......................... 201910023268.X

(51) Int. Cl.
*H04W 52/12*    (2009.01)
*H04W 68/12*    (2009.01)
(Continued)

(52) U.S. Cl.
CPC ... *H04W 52/0229* (2013.01); *H04W 52/0216* (2013.01); *H04W 52/143* (2013.01); *H04W 68/02* (2013.01); *H04W 76/28* (2018.02)

(58) Field of Classification Search
CPC ......... H04W 52/0229; H04W 52/0216; H04W 52/143; H04W 68/02; H04W 76/28;
(Continued)

(56) References Cited

U.S. PATENT DOCUMENTS 2,647,442 A * 8/1953  Schiff ....................... F41A 9/50
                                                89/33.17
9,504,012 B1 * 11/2016 Ljung ............. H04W 36/00837
(Continued)

FOREIGN PATENT DOCUMENTS

CA     2647442 A1 * 10/2007 .......... H04J 11/0069
CN    101155402 A      4/2008
(Continued)

OTHER PUBLICATIONS

InterDigital Inc. "Discontinuous reception in NR-Unlicensed", 3GPP TSG-RAN WG2 NR AH 1807 Meeting, R2-1809611, Montreal, Canada, Jul. 2-6, 2018.
(Continued)

*Primary Examiner* — Inder P Mehra
(74) *Attorney, Agent, or Firm* — Price Heneveld LLP

(57) ABSTRACT

A method and an apparatus for transmitting indication signaling, a method and an apparatus for receiving indication signaling, a network side device and user equipment are provided. The method includes: transmitting indication signaling on a target physical resource or a target downlink
(Continued)

Receiving indication signaling transmitted by the network side device on the target physical resource or the target downlink control channel — 51 control channel, wherein the indication signaling includes monitoring information for at least one UE, and the monitoring information includes at least one of: first indication information, used to indicate an activity state for at least one subsequent discontinuous reception (DRX) cycle; second indication information, used to indicate a DRX parameter configuration for the at least one subsequent DRX cycle; third indication information, used to indicate monitoring information of a downlink control channel to be monitored; fourth indication information, used to indicate a monitoring state in at least one subsequent paging occasion.

16 Claims, 5 Drawing Sheets

(51) Int. Cl.
  *H04W 76/28* (2018.01)
  *H04W 68/00* (2009.01)
  *H04W 52/02* (2009.01)
  *H04W 52/14* (2009.01)
  *H04W 68/02* (2009.01)

(58) Field of Classification Search
  CPC ............... H04W 52/028; H04W 68/00; H04W 52/0212; Y02D 30/70
  USPC ......................................................... 370/311
  See application file for complete search history.

(56) References Cited

U.S. PATENT DOCUMENTS

| | | | | |
|---|---|---|---|---|
| 11,375,513 | B2* | 6/2022 | Takeda | H04L 27/2607 |
| 2003/0028441 | A1* | 2/2003 | Barsness | G06Q 30/02 |
| | | | | 705/26.1 |
| 2008/0159507 | A1* | 7/2008 | Virolainen | H04M 1/72412 |
| | | | | 379/202.01 |
| 2011/0183663 | A1 | 7/2011 | Kenehan et al. | |
| 2012/0188930 | A1* | 7/2012 | Mao | H04W 72/005 |
| | | | | 370/312 |
| 2014/0211747 | A1 | 7/2014 | Takeda et al. | |
| 2015/0117354 | A1 | 4/2015 | Dai et al. | |
| 2015/0156719 | A1 | 6/2015 | Quan et al. | |
| 2016/0044632 | A1 | 2/2016 | Liang et al. | |
| 2017/0195028 | A1 | 7/2017 | Shimezawa et al. | |
| 2017/0347322 | A1* | 11/2017 | Lee | H04W 52/18 |
| 2018/0007734 | A1 | 1/2018 | Kela et al. | |
| 2018/0077682 | A1 | 3/2018 | Li et al. | |
| 2018/0278454 | A1* | 9/2018 | Islam | H04L 27/2655 |
| 2019/0313337 | A1 | 10/2019 | Wilhelmsson et al. | |
| 2019/0327709 | A1 | 10/2019 | Li et al. | |
| 2020/0112944 | A1* | 4/2020 | Jiang | H04W 76/27 |
| 2021/0075558 | A1* | 3/2021 | Takeda | H04L 5/0053 |

FOREIGN PATENT DOCUMENTS

| | | | | |
|---|---|---|---|---|
| CN | 101925161 A | | 12/2010 | |
| CN | 102130711 A | | 7/2011 | |
| CN | 102595573 A | | 7/2012 | |
| CN | 102858014 A | | 1/2013 | |
| CN | 104115513 A | * | 10/2014 | ......... G06F 12/0246 |
| CN | 104219738 A | | 12/2014 | |
| CN | 104254112 A | * | 12/2014 | ........... H04L 1/1812 |
| CN | 105722195 A | | 6/2016 | |
| CN | 106604396 A | | 4/2017 | |
| CN | 108282862 A | | 7/2018 | |
| CN | 110710302 B | * | 10/2020 | ........... H04L 5/0048 |
| JP | 2015524635 A | | 8/2015 | |
| JP | 2020504935 A | | 2/2020 | |
| WO | 2013020417 A1 | | 2/2013 | |
| WO | 2014020819 A1 | | 2/2014 | |
| WO | 2014153698 A1 | | 10/2014 | |
| WO | 2015182742 A1 | | 12/2015 | |
| WO | 2018108265 A1 | | 6/2018 | |
| WO | 2018144873 A1 | | 8/2018 | |

OTHER PUBLICATIONS

Qualcomm Inc., "UE Power Saving during Active State", 3GPP TSG RAN WG2 Nr #99bis, R2-1711904, Prague, Czech, Oct. 9-13, 2017.

Huawei, "Design considerations for UE power saving", 3GPP TSG RAN WGI Meeting #93, RI-1807306, Busan, Korea, May 21-25, 2018.

Qualcomm Inc., "Advanced Grant Indication for UE Power Saving", 3GPP TSG RAN WG1 NR AdHoc#3, R1-1716418, Nagoya, Japan, Sep. 18-21, 2017.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.0.0 (Dec. 2017).

* cited by examiner

Transmitting indication signaling on a target physical resource or a target downlink control channel, wherein the indication signaling includes detection information for at least one UE — 21

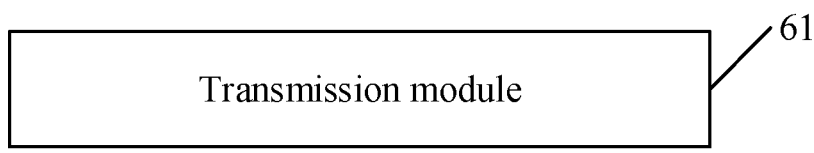
Fig. 5
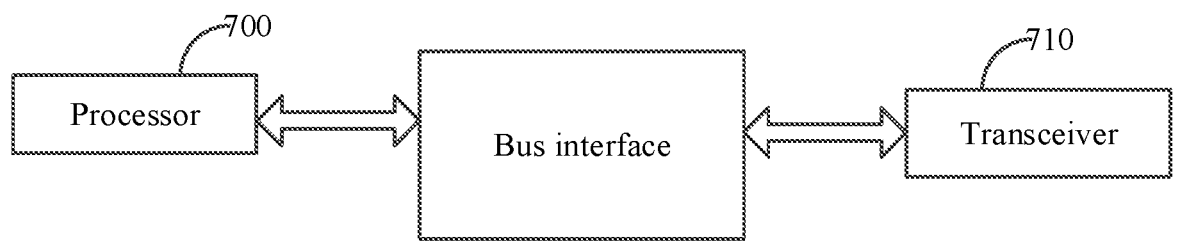
Fig. 6
Fig. 7
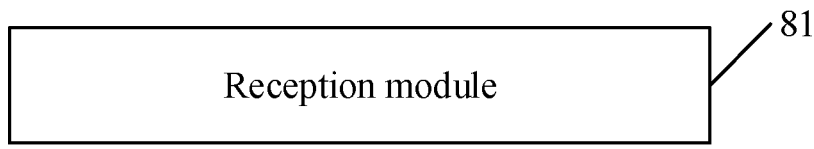
Fig. 8

METHOD AND APPARATUS FOR TRANSMITTING INDICATION SIGNALING, METHOD AND APPARATUS FOR RECEIVING INDICATION SIGNALING, NETWORK SIDE DEVICE, AND USER EQUIPMENT

CROSS-REFERENCE TO RELATED APPLICATION

The present application is the U.S. national phase of PCT Application No. PCT/CN2019/096082 filed on Jul. 16, 2019, which claims a priority to the Chinese patent application No. 201811010219.4 filed in China on Aug. 31, 2018, and claims a priority to the Chinese patent application No. 201910023268.X filed in China on Jan. 10, 2019, disclosures of which are incorporated herein by reference in their entireties.

TECHNICAL FIELD

The present disclosure relates to the field of communication technologies, in particular to a method and an apparatus for transmitting indication signaling, a method and an apparatus for receiving indication signaling, a network side device and user equipment.

BACKGROUND

In a 5G system, UE needs to monitor a wider bandwidth and supports a greater rate, resulting in a greater UE power consumption than that in a long term evolution (LTE) system; on the other hand, as functions supported by new radio (NR) increase, user equipment (UE) may need to support different services at different moments, and thus UE is more frequently used, which may also increase power consumption.

Energy consumption of UE is mainly reflected in following two aspects.

Paging: UE needs to wake up in each paging occasion (PO) to monitor a physical downlink control channel (PDCCH). However, since a base station does not necessarily configure a page message for the UE, the UE consumes a great amount of energy at the PDCCH monitoring stage.

PDCCH without grant: in a radio resource control (RRC) connected state, UE blindly monitors a PDCCH, but grant information for the UE is absent, thus a great amount of energy is consumed.

Major power saving schemes in the related art are as follows.

1. For Power Saving in an Idle State

In the field of cellular Internet of things (IOT), UE power saving technologies have been discussed. According to the technologies, a wake up signal (WUS) is introduced for power saving in an idle state. The WUS is used to indicate to UE whether monitoring needs to be performed in the following paging occasion (PO). The UE continues to monitor for a paging PDCCH only if the UE monitors a WUS; if the UE fails to monitor a WUS, the UE will not perform monitoring in the following paging occasion (PO).

The WUS signal is a length-131 Zadoff-Chu (ZC) sequence and carries a cell identifier (cell ID). A maximum time domain duration of WUS is configured at a higher layer, and a gap between the WUS and a PDCCH scheduling a paging message is configured, as shown in FIG. 1. Since Narrow Band (NB) is a narrowband system, the WUS occupies the entire bandwidth of NB in frequency domain, and occupies one subframe in time domain, i.e., 1 ms.

2. For Power Saving in an Connected State

In LTE, connected discontinuous reception (C-DRX) is configured in an RRC connected state to achieve a balance between power saving performance and latency performance. For different UE, different types of services and different service enablement models may exist. The demands of different users are satisfied by configuring different parameters for different UE.

However, the adjustment of C-DRX is semi-static and thus relatively slow. On the other hand, even in the C-DRX mode, the power consumption ratio for UE monitoring PDCCH is high.

The control channel monitor supports different parameter configurations, e.g., different control channel monitor periodicity, different quantities of control channel monitor candidates, etc. Although adjustments of the parameters may be made, all adjustments are achieved through higher layer signaling, thus the adjustment period is relatively long.

Even if some power saving mechanisms are introduced in NR, UE manufacturers still consider power consumption in the connected state as the major contributor to UE power consumption. The power consumption in the connected state consists primarily in that: the UE needs to blindly monitor all PDCCH candidates in a PDCCH monitoring occasion to acquire PDCCH scheduling information, but in most cases, the UE performs blind monitor and in so doing, consumes significant power because there is no practically valid uplink or downlink scheduling information available, i.e., in fact, the base station does not transmit a control channel, or the base station merely transmits a small portion of vast PDCCH monitoring possibilities, and UE has no apriori information so that more power is consumed during blind monitor.

The WUS designs in NB are mainly directed to the problem of power consumption resulting from monitoring invalid PDCCH by UE in an idle state. For NR, efforts to provide a physical layer power saving solution focus on researching a power saving technique for the connected state.

On one hand, since NR system bandwidth may be up to several hundred MHz and, obviously, to occupy the entire bandwidth would incur excessive overhead, the WUS design occupying the entire system bandwidth and the entire subframe is not applicable any more. The frequency of control channel scheduling is on the order of slot in the connected state, while the paging periodicity in the idle state is on the order of tens or hundreds of milliseconds. If each control channel scheduling is provided with one wakeup signal of a duration of the order of slot (the time domain unit of scheduling in LTE is subframe, which includes 14 orthogonal frequency division multiplexing (OFDM) symbols for a subcarrier spacing of 15 KHz; the time domain unit of scheduling in NR is slot or mini-slot, and one slot includes 14 OFDM symbols irrespective of the size of the subcarrier spacing), the resultant overhead would be unbearable.

On the other hand, the complexity of control channel monitor in the connected state in NR originates from various aspects, such as a monitoring frequency, a quantities of monitored control channel candidates, and a monitored bandwidth. The WUS design in the narrow band Internet of Things (NB-IOT) only requires an indication as to whether a PDCCH for a paging channel is to be monitored.

Furthermore, since parameters are configured at a higher layer, the connected-state power saving scheme configured with DRX has the following disadvantages: the parameter adjustment is inflexible, and the power saving effect cannot adapt rapidly to the UE service type, and thus needs to be improved.

In summary, the WUS design in NB cannot satisfy the requirements of NR connected-state power saving.

SUMMARY

An objective of the present disclosure is to provide a method and an apparatus for transmitting indication signaling, a method and an apparatus for receiving indication signaling, a network side device and user equipment, to solve the problem in the related art that the wakeup signal configuration cannot satisfy the requirements of NR connected-state power saving.

To solve the foregoing problem, an embodiment of the present disclosure provides a method for transmitting indication signaling, applied to a network side device, including:

transmitting indication signaling on a target physical resource or a target downlink control channel, wherein the indication signaling includes monitoring information for at least one user equipment (UE), and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

The target physical resource includes: a first orthogonal frequency division multiplexing (OFDM) symbol of a slot; and/or, an OFDM symbol where a control resource set (CORESET) for a downlink control channel is transmitted.

The target downlink control channel includes: a control channel carrying common control information and/or a control channel carrying UE specific control information.

The transmitting the indication signaling on the target physical resource or the target downlink control channel includes:

encoding the indication signaling in a manner where a mapping relationship between information bits and encoded bits exists; and/or, encoding the indication signaling in a channel manner where an information bit is repeated or a code rate is low;

transmitting the encoded indication signaling on the target physical resource or the target downlink control channel.

The indication signaling is carried on the target physical resource or the target downlink control channel by means of a sequence.

A frequency domain resource mapping unit of the target physical resource is: a resource element group (REG) of the downlink control channel; or, N resource blocks (RBs), wherein N is an integer greater than or equal to 1.

A frequency domain resource position of the target physical resource is determined by predefinition or by network side signaling configuration; and/or, a time domain OFDM symbol position of the target physical resource is determined by predefinition or by network side signaling configuration.

In a case that the indication signaling includes the first indication information, the activity state for the at least one subsequent DRX cycle indicated by the first indication information includes at least one of:

whether a drx-onDurationTimer is activated for the at least one subsequent DRX cycle in a case that a specified condition is met;

whether a downlink control channel is monitored in an active period for the at least one subsequent DRX cycle;

the drx-onDurationTimer is activated for the at least one subsequent DRX cycle in the case that the specified condition is met;

the downlink control channel is monitored in the active period for the at least one subsequent DRX cycle;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

In a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

In a case that the indication signaling includes the third indication information, the third indication information indicates the monitoring information of the downlink control channel to be monitored through a value of at least one of following information:

a type of a search space to be monitored;
a candidate of the search space to be monitored;
a search space set to be monitored;
a radio network temporary identifier (RNTI) type of the search space to be monitored;
a format of downlink control information to be monitored; and
a length of the downlink control information to be monitored.

The type of the search space to be monitored includes: a common search space and/or a UE specific search space.

A value of the search space set to be monitored includes: an index of a group of search space sets to be monitored, and/or, an index of the search space set to be monitored; wherein the group of search space sets to be monitored includes at least two search space sets to be monitored.

A value of the candidate of the search space to be monitored includes at least one of: a ratio value of candidates of the search space to be monitored, an aggregation level of candidates of the search space to be monitored, and an identifier of an aggregation level group of candidates of the search space to be monitored; wherein the aggregation level group of the candidates of the search space to be monitored includes: at least two aggregation levels of the candidates of the search space to be monitored.

The indication signaling is common indication signaling or UE specific indication signaling.

In a case that the indication signaling is the common indication signaling, monitoring information for different UE corresponds to different bits or a same bit in the indication signaling.

An embodiment of the present disclosure further provides a method for receiving indication signaling, applied to user equipment (UE), including:

receiving indication signaling transmitted by a network side device on a target physical resource or a target downlink control channel, wherein the indication signaling includes monitoring information for at least one UE, and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

The target physical resource includes: a first orthogonal frequency division multiplexing (OFDM) symbol of a slot; and/or, an OFDM symbol where a control resource set (CORESET) for a downlink control channel is transmitted.

The target downlink control channel includes: a control channel carrying common control information and/or a control channel carrying UE specific control information.

The receiving the indication signaling transmitted by the network side device on the target physical resource or the target downlink control channel includes: receiving encoded indication signaling transmitted by the network side device on the target physical resource or the target downlink control channel;

wherein the indication signaling is encoded by the network side device in a manner where a mapping relationship between information bits and encoded bits exists; and/or, the indication signaling is encoded by the network side device in a channel manner where an information bit is repeated or a code rate is low.

The indication signaling is carried on the target physical resource or the target downlink control channel by means of a sequence.

A frequency domain resource mapping unit of the target physical resource is: a resource element group (REG) of the downlink control channel; or, N resource blocks (RBs), wherein N is an integer greater than or equal to 1.

A frequency domain resource position of the target physical resource is determined by predefinition or by network side signaling configuration; and/or, a time domain OFDM symbol position of the target physical resource is determined by predefinition or by network side signaling configuration.

In a case that the indication signaling includes the first indication information, the activity state for the at least one subsequent DRX cycle indicated by the first indication information includes at least one of:

whether a drx-onDurationTimer is activated for the at least one subsequent DRX cycle in a case that a specified condition is met;

whether a downlink control channel is monitored in an active period for the at least one subsequent DRX cycle;

the drx-onDurationTimer is activated for the at least one subsequent DRX cycle in the case that the specified condition is met;

the downlink control channel is monitored in the active period for the at least one subsequent DRX cycle;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

In a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

In a case that the indication signaling includes the third indication information, the third indication information indicates the monitoring information of the downlink control channel to be monitored through a value of at least one of following information:

a type of a search space to be monitored;
a candidate of the search space to be monitored;
a search space set to be monitored;
a radio network temporary identifier (RNTI) type of the search space to be monitored;
a format of downlink control information to be monitored; and
a length of the downlink control information to be monitored.

The type of the search space to be monitored includes: a common search space and/or a UE specific search space.

A value of the search space set to be monitored includes: an index of a group of search space sets to be monitored, and/or, an index of the search space set to be monitored; wherein the group of search space sets to be monitored includes at least two search space sets to be monitored.

A value of the candidate of the search space to be monitored includes at least one of: a ratio value of candidates of the search space to be monitored, an aggregation level of candidates of the search space to be monitored, and an identifier of an aggregation level group of candidates of the search space to be monitored; wherein the aggregation level group of the candidates of the search space to be monitored includes: at least two aggregation levels of the candidates of the search space to be monitored.

The indication signaling is common indication signaling or UE specific indication signaling.

In a case that the indication signaling is the common indication signaling, monitoring information for different UE corresponds to different bits or a same bit in the indication signaling.

An embodiment of the present disclosure further provides an apparatus for transmitting indication signaling, applied to a network side device, including:

a transmission module, configured to transmit indication signaling on a target physical resource or a target downlink control channel, wherein the indication signaling includes monitoring information for at least one user equipment (UE), and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

An embodiment of the present disclosure further provides a network side device, including a processor and a transceiver, wherein the processor is configured to control the transceiver to implement following process:

transmitting indication signaling on a target physical resource or a target downlink control channel, wherein the indication signaling includes monitoring information for at least one user equipment (UE), and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

The target physical resource includes: a first orthogonal frequency division multiplexing (OFDM) symbol of a slot; and/or, an OFDM symbol where a control resource set (CORESET) for a downlink control channel is transmitted.

The target downlink control channel includes: a control channel carrying common control information and/or a control channel carrying UE specific control information.

The processor is further configured to: encode the indication signaling in a manner where a mapping relationship between information bits and encoded bits exists; and/or, encode the indication signaling in a channel manner where an information bit is repeated or a code rate is low; the transceiver is further configured to: transmit the encoded indication signaling on the target physical resource or the target downlink control channel.

The processor is further configured to carry the indication signaling on the target physical resource or the target downlink control channel by means of a sequence.

A frequency domain resource mapping unit of the target physical resource is: a resource element group (REG) of the downlink control channel; or, N resource blocks (RBs), wherein N is an integer greater than or equal to 1.

A frequency domain resource position of the target physical resource is determined by predefinition or by network side signaling configuration; and/or, a time domain OFDM symbol position of the target physical resource is determined by predefinition or by network side signaling configuration.

In a case that the indication signaling includes the first indication information, the activity state for the at least one subsequent DRX cycle indicated by the first indication information includes at least one of:

whether a drx-onDurationTimer is activated for the at least one subsequent DRX cycle in a case that a specified condition is met;

whether a downlink control channel is monitored in an active period for the at least one subsequent DRX cycle;

the drx-onDurationTimer is activated for the at least one subsequent DRX cycle in the case that the specified condition is met;

the downlink control channel is monitored in the active period for the at least one subsequent DRX cycle;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

In a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

In a case that the indication signaling includes the third indication information, the third indication information indicates the monitoring information of the downlink control channel to be monitored through a value of at least one of following information:

a type of a search space to be monitored;

a candidate of the search space to be monitored;

a search space set to be monitored;

a radio network temporary identifier (RNTI) type of the search space to be monitored;

a format of downlink control information to be monitored; and a length of the downlink control information to be monitored.

The type of the search space to be monitored includes: a common search space and/or a UE specific search space.

A value of the search space set to be monitored includes: an index of a group of search space sets to be monitored, and/or, an index of the search space set to be monitored; wherein the group of search space sets to be monitored includes at least two search space sets to be monitored.

A value of the candidate of the search space to be monitored includes at least one of: a ratio value of candidates of the search space to be monitored, an aggregation level of candidates of the search space to be monitored, and an identifier of an aggregation level group of candidates of the search space to be monitored; wherein the aggregation level group of the candidates of the search space to be monitored includes: at least two aggregation levels of the candidates of the search space to be monitored.

The indication signaling is common indication signaling or UE specific indication signaling.

In a case that the indication signaling is the common indication signaling, monitoring information for different UE corresponds to different bits or a same bit in the indication signaling.

An embodiment of the present disclosure further provides an apparatus for receiving indication signaling, applied to user equipment (UE), including:

a reception module, configured to receive indication signaling transmitted by a network side device on a target physical resource or a target downlink control channel, wherein the indication signaling includes monitoring information for at least one UE, and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

An embodiment of the present disclosure further provides user equipment (UE), including a processor and a transceiver, wherein the processor is configured to control the transceiver to implement following process:

receiving indication signaling transmitted by a network side device on a target physical resource or a target downlink control channel, wherein the indication signaling includes monitoring information for at least one UE, and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

The target physical resource includes: a first orthogonal frequency division multiplexing (OFDM) symbol of a slot; and/or, an OFDM symbol where a control resource set (CORESET) for a downlink control channel is transmitted.

The target downlink control channel includes: a control channel carrying common control information and/or a control channel carrying UE specific control information.

The transceiver is further configured to: receive encoded indication signaling transmitted by the network side device on the target physical resource or the target downlink control channel;

wherein the indication signaling is encoded by the network side device in a manner where a mapping relationship between information bits and encoded bits exists; and/or, the indication signaling is encoded by the network side device in a channel manner where an information bit is repeated or a code rate is low.

The indication signaling is carried on the target physical resource or the target downlink control channel by means of a sequence.

A frequency domain resource mapping unit of the target physical resource is: a resource element group (REG) of the downlink control channel; or, N resource blocks (RBs), wherein N is an integer greater than or equal to 1.

A frequency domain resource position of the target physical resource is determined by predefinition or by network side signaling configuration; and/or, a time domain OFDM symbol position of the target physical resource is determined by predefinition or by network side signaling configuration.

In a case that the indication signaling includes the first indication information, the activity state for the at least one subsequent DRX cycle indicated by the first indication information includes at least one of:

whether a drx-onDurationTimer is activated for the at least one subsequent DRX cycle in a case that a specified condition is met;

whether a downlink control channel is monitored in an active period for the at least one subsequent DRX cycle;

the drx-onDurationTimer is activated for the at least one subsequent DRX cycle in the case that the specified condition is met;

the downlink control channel is monitored in the active period for the at least one subsequent DRX cycle;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

In a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

In a case that the indication signaling includes the third indication information, the third indication information indicates the monitoring information of the downlink control channel to be monitored through a value of at least one of following information:

a type of a search space to be monitored;

a candidate of the search space to be monitored;

a search space set to be monitored;

a radio network temporary identifier (RNTI) type of the search space to be monitored;

a format of downlink control information to be monitored; and a length of the downlink control information to be monitored.

The type of the search space to be monitored includes: a common search space and/or a UE specific search space.

A value of the search space set to be monitored includes: an index of a group of search space sets to be monitored, and/or, an index of the search space set to be monitored;

wherein the group of search space sets to be monitored includes at least two search space sets to be monitored.

A value of the candidate of the search space to be monitored includes at least one of: a ratio value of candidates of the search space to be monitored, an aggregation level of candidates of the search space to be monitored, and an identifier of an aggregation level group of candidates of the search space to be monitored;

wherein the aggregation level group of the candidates of the search space to be monitored includes: at least two aggregation levels of the candidates of the search space to be monitored.

The indication signaling is common indication signaling or UE specific indication signaling.

In a case that the indication signaling is the common indication signaling, monitoring information for different UE corresponds to different bits or a same bit in the indication signaling.

An embodiment of the present disclosure further provides a computer readable storage medium storing therein a computer program, wherein the computer program is configured to be executed by a processor, to implement the steps of the foregoing method for transmitting indication signaling, or to implement the steps of the foregoing method for receiving indication signaling.

The foregoing technical solutions of the present disclosure have at least following beneficial effects: in the method and the apparatus for transmitting indication signaling, the method and the apparatus for receiving indication signaling, the network side device and the user equipment, monitoring information for UE is indicated dynamically on the target physical resource or the target downlink control channel, such that the UE may monitor the downlink control channel according to the corresponding monitoring information, to achieve the objective of power saving.

BRIEF DESCRIPTION OF THE DRAWINGS

FIG. 5 is a flow diagram of a method for receiving indication signaling according to an embodiment of the present disclosure;
FIG. 6 is a schematic structural diagram of an apparatus for transmitting indication signaling according to an embodiment of the present disclosure;
FIG. 7 is a schematic structural diagram of a network side device according to an embodiment of the present disclosure;
FIG. 8 is a schematic structural diagram of an apparatus for receiving indication signaling according to an embodiment of the present disclosure.

DETAILED DESCRIPTION

To describe the technical problem to be solved, the technical solutions and the advantages of the present disclosure more clearly, embodiments are described in detail hereinafter with reference to the accompanying drawings.

Figures 1, 2:
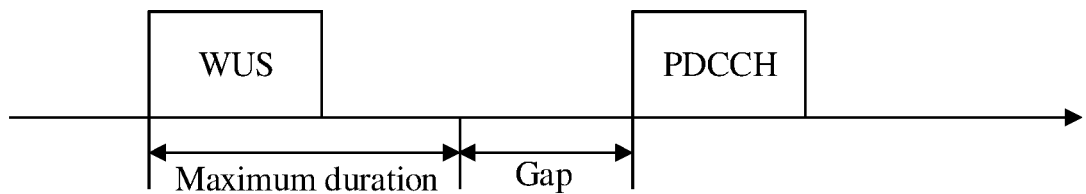
FIG. 1 is a schematic diagram of a wakeup signal (WUS) in the related art.
FIG. 2 is a flow diagram of a method for transmitting indication signaling according to an embodiment of the present disclosure.

As shown in FIG. 2, an embodiment of the present disclosure provides a method for transmitting indication signaling. The method is applied to a network side device and includes a step 21.

Step 21, transmitting indication signaling on a target physical resource or a target downlink control channel, wherein the indication signaling includes monitoring information for at least one UE, and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

In the foregoing embodiment of the present disclosure, monitoring information (or referred to as monitor parameter) for at least one UE is indicated by indication signaling, and the indication signaling may be carried by the target physical resource or the target downlink control channel; the UE performs control channel monitor based on the indication of the indication signaling, thereby reducing unnecessary monitor.

As an embodiment, when the indication signaling is carried by the target physical resource, the indication signaling adopts a simple encoding, and does not need to undergo Polar encoding as in the case of a control channel. For example, the indication signaling adopts a manner in which there is a direct mapping relationship between information bits and encoded bits (for example, the mapping relationship is listed in a table); for another example, the indication signaling adopts a manner in which an information bit is repeated or other manner with low code rate.

That is, the step 21 includes: encoding the indication signaling in a manner where a mapping relationship between information bits and encoded bits exists; and/or, encoding the indication signaling in a channel manner where an information bit is repeated or a code rate is low; transmitting the encoded indication signaling on the target physical resource or the target downlink control channel.

Further, the time domain OFDM symbol position of the target physical resource includes: a first orthogonal frequency division multiplexing (OFDM) symbol of a slot (that is, the target physical resource is mapped to the first OFDM symbol of a slot); and/or, an OFDM symbol where a control resource set (CORESET) for a downlink control channel is transmitted (that is, the target physical resource is mapped to the OFDM symbol where a CORESET for a downlink control channel is transmitted).

It is noted, the CORESET occupies up to three OFDM symbols in the time domain, and the time-domain starting position is determined by a search space configuration.

It is further noted, the target physical resource may be mapped to all OFDM symbols where the CORESET for a downlink control channel is transmitted, or the target physical resource may be mapped to some of the OFDM symbols where the CORESET for a downlink control channel is transmitted.

Specifically, in the foregoing embodiment of the present disclosure, the frequency domain resource mapping unit of the target physical resource is: a resource element group (REG) of the downlink control channel; or N resource blocks (RBs), wherein N is an integer greater than or equal to 1. Optionally, N is equal to 6. The frequency domain position of the target physical resource is allocated with a resource granularity of 6 RBs at the higher layer through multiple-bit indication. An advantage of taking 6 RBs as a mapping unit consists in that a compatibility with the resource allocation of control resource set (CORESET) is achieved, since the frequency domain resource allocation of CORESET is to indicate, in form of a bitmap, whether a resource group of 6 PRBs is allocated to the CORESET.

Figure 3:
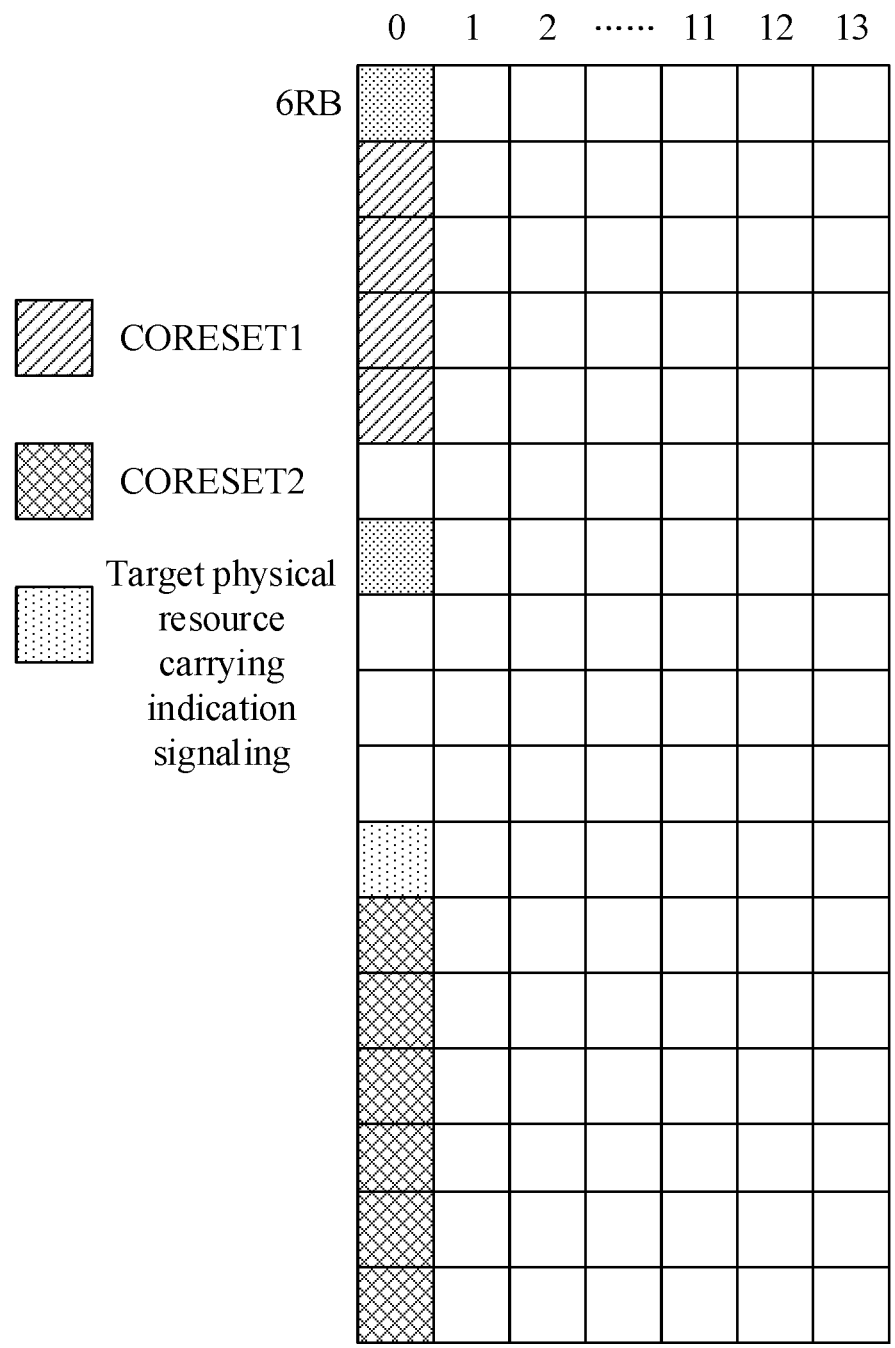
FIG. 3 is a first schematic diagram of time-frequency domain positions of indication signaling according to an embodiment of the present disclosure.
Figure 4:
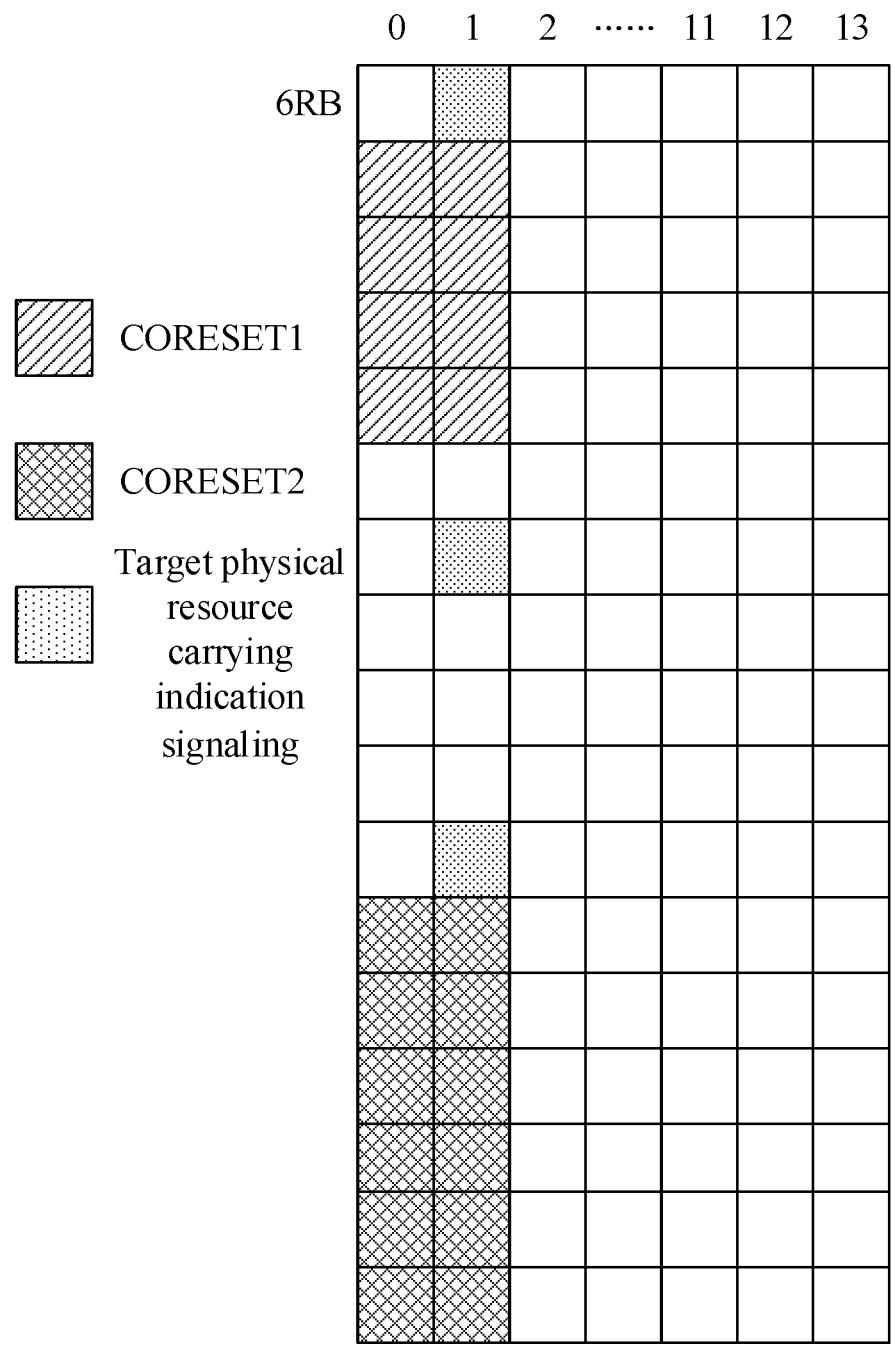
FIG. 4 is a second schematic diagram of time-frequency domain positions of indication signaling according to an embodiment of the present disclosure.

As shown in FIG. 3, the target physical resource is mapped to the first symbol of a slot, and 6 RBs are taken as the frequency domain resource mapping unit. As shown in FIG. 4, the target physical resource is mapped to the OFDM symbol where the CORESET is transmitted, and 6 RBs are taken as the frequency domain resource mapping unit.

It is noted, frequency domain resource position of the target physical resource is determined by predefinition or by network side signaling configuration; and/or, a time domain OFDM symbol position of the target physical resource is determined by predefinition or by network side signaling configuration.

As another embodiment, in a case that the indication signaling is carried by the target downlink control channel, the target downlink control channel includes: a control channel carrying common control information and/or a control channel carrying UE specific control information.

Since the common control channel has fewer monitor candidates and the positions of the candidates in the search space are determinate, the monitoring complexity of the common control channel is relatively low.

Further, in the foregoing embodiments of the present disclosure, the indication signaling is carried on the target physical resource or the target downlink control channel by means of a sequence. That is, the target physical resource or the target downlink control channel carries a sequence, and the indication signal is identified by the sequence. Indication signaling for different UE may be distinguished from each other by using different orthogonal codes, and transmitted on the same transmission resource.

It is noted, the indication signaling according to the foregoing embodiments of the present disclosure includes at least one of the first indication information, the second indication information, the third indication information and the fourth indication information.

In a first aspect, in a case that the indication signaling includes the first indication information, the activity state for the at least one subsequent DRX cycle indicated by the first indication information includes at least one of:

whether a discontinuous reception-onDurationTimer drx-onDurationTimer is activated for the at least one subsequent DRX cycle in a case that a specified condition is met;

whether a downlink control channel (e.g., PDCCH) is monitored in an active period for the at least one subsequent DRX cycle;

the drx-onDurationTimer is activated for the at least one subsequent DRX cycle in the case that the specified condition is met; in other words, once the information is monitored, the UE needs to activate the drx-onDurationTimer, and if the information is not monitored, the UE does not need to activate the drx-onDurationTimer;

the downlink control channel (e.g., PDCCH) is monitored in the active period for the at least one subsequent DRX cycle; in other words, once the information is monitored, the UE needs to monitor the PDCCH, and if the information is not monitored, the UE does not need to monitor the PDCCH;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

In brief, the first indication information is used to indicate whether the PDCCH is to be monitored or whether the drx-onDurationTimer is to be activated for a subsequent period in which the drx-onDurationTimer is supposed to be activated. Speaking in a plainer manner, the first indication information is used to indicate whether UE needs to be woken up in an on duration stage. For example, if a certain state of the indication signaling represents that the UE does not need to be woken up to receive the PDCCH in a subsequent on duration stage, that is, no PDCCH is scheduled in the on duration stage, the UE may remain in the inactivity state, so as to achieve power saving effect.

For example, when the drx-ShortCycle is used, the first constraint relationship is to satisfy: [(SFN×10)+subframe number] modulo (drx-ShortCycle)=(drx-StartOffset) modulo (drx-ShortCycle); when the drx-LongCycle is used, the second constraint relationship is to satisfy: [(SFN×10)+subframe number] modulo (drx-LongCycle)=drx-StartOffset. The drx-onDurationTimer is activated at a time position offset by the drx-SlotOffset from the starting position of the subframe satisfying the first constraint relationship or second constraint relationship.

By means of the first indication information, whether the drx-onDurationTimer is to be activated for subsequent time periods in which the drx-onDurationTimer is supposed to be activated can be indicated, or whether the PDCCH is to be monitored in the subsequent active period can be indicated.

The aforementioned active period forcludes the active period described in 3GPP TS 38.321. When DRX is configured, the active period forcludes the following:

a period in which drx-onDurationTimer, drx-InactivityTimer, drx-RetransmissionTimerDL, drx-RetransmissionTimerUL or ra-ContentionResolutionTimer is running; or a period in which an uplink scheduling request (SR) is transmitted on the PUCCH and a response is not yet received (in a pending stage); or a period in which a random access response is received successfully, wherein a random access sequence corresponding to the random access response is not selected by a medium access control (MAC) entity from contention-based random access sequences, but a PDCCH corresponding to the cell radio network temporary identifier (C-RNTI) of the MAC entity and indicating new data transmission is not yet received.

In a second aspect, in a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

In brief, there are two indication manners for the DRX parameter configuration as follows:

the higher layer signaling configures multiple DRX parameter configurations, and each parameter configuration has part of its parameters different from the remaining parameter configurations. The second indication information indicates one of the parameter configurations as the parameter configuration to be used in the immediate wakeup stage, so as to achieve the dynamic adjustment of DRX parameter configuration;

the higher layer signaling configures one DRX parameter configuration, and the signaling indicates a scaling factor for scaling the timer value or slot periodicity offset value in the DRX parameter configuration, to obtain the DRX parameter configuration applied to the current on duration wakeup stage.

For example, the scaling factor has a value such as ⅛, ¼, ½, 1, 2, 4 or 8. For the timer value in the DRX parameter configuration, the scaling factor is multiplied with the timer value configured at the higher layer, and the result is compared with optional values in the timer value range to locate the maximum timer value, or a maximum optional value less than the multiplication result, or a minimum optional value greater than the multiplication result as the updated timer value.

For the scaling of long DRX cycle and short DRX cycle, the periodicity and offset value of the long DRX cycle are defined simultaneously, the periodicity and the offset value may undergo scaling first, then a rounding operation as described above may be performed thereon. The value of the short DRX cycle may be based on a proportion value k with respect to the long DRX cycle in the higher layer configuration, e.g., the long DRX cycle is k times the short DRX cycle. Thus, the value of short DRX cycle is obtained by directly dividing the scaled long DRX cycle value by k, wherein k is a predefined value.

It is noted, the DRX parameter configuration includes at least one of the following: drx-onDurationTimer, drx-InactivityTimer, drx-HARQ-RTT-TimerDL, drx-HARQ-RTT-TimerUL, drx-RetransmissionTimerDL, drx-RetransmissionTimerUL, drx-LongCycleStartOffset, shortDRX and drx-SlotOffset.

In a third aspect, in a case that the indication signaling includes the third indication information, the third indication information indicates the monitoring information of the downlink control channel to be monitored through a value of at least one of following information:

a type of a search space to be monitored;
a candidate of the search space to be monitored;
a search space set to be monitored;
a radio network temporary identifier (RNTI) type of the search space to be monitored;
a format of downlink control information to be monitored; and
a length of the downlink control information to be monitored.

The type of the search space to be monitored includes: a common search space and/or a UE specific search space.

The complexity of downlink control channel monitor originates from the fact that UE has to blindly monitor many control channel configurations simultaneously, e.g., many search space types, many control channel formats, many candidates, etc.

Accordingly, by means of the third indication information, these search space types, downlink control information (DCI) formats, candidates, or even search space sets, RNTI types for scrambling are combined and the corresponding values are indicated to UE, so that the UE may only perform the blind monitoring of some the control candidates according to the indication signaling and omits unnecessary monitor, thus UE monitor complexity is lowered.

A design of the third indication information incorporates different values of some or all of the aforementioned information. Here, the control channel monitor by a UE in a connected state is taken as an example. For the UE in the connected state, the system information is only read in a fixed occasion, and the modification of system message is indicated through a paging message. Thus, the system message monitor is ignored for the common search space. The monitor of the following may be considered: control channel for the paging message (transmitting control information scrambled with P-RNTI (Paging-RNTI)), random access response (RAR) (transmitting control information scrambled with RA-RNTI or TC-RNTI), and other type3 common control information used for slot format indicator (SFI), power control command, interrupted transmission indicator and the like.

The type of the search space includes: a common search space and a UE specific search space. That is, both the common search space and the UE specific search space are to be monitored.

The format of downlink control information, i.e., DCI format, includes: DCI formats 0_0, 1_0, 2_0, 2_1, 2_2 and 2_3 for common search space, and DCI formats 0_1, 1_1, 0_0 and 1_0 for UE specific search space.

These formats may further be grouped according to DCI lengths of the formats, and formats in the same group are indicated by one state. For example, since the DCI formats 0_0, 1_0, 2_2, 2_3 for common search space have the same DCI length, the formats may be combined to be indicated by the same state. In this case, if the state is indicated, then according to the search space configuration, if the search space monitoring positions according to these formats, namely, monitoring occasions, occur in the same slot, the UE may need to blindly monitor the multiple DCI formats simultaneously.

As an optional embodiment, the value of the candidate of the search space to be monitored includes at least one of: a ratio value of candidates of the search space to be monitored, an aggregation level of candidates of the search space to be monitored, and an identifier of an aggregation level group of candidates of the search space to be monitored; wherein the aggregation level group of the candidates of the search space to be monitored includes: at least two aggregation levels of the candidates of the search space to be monitored.

For example, the ratio value of candidates of the search space may be a ratio of candidates configured in the search space, such as ¼, ½ or 1, that is, only first ¼ of candidates, only ½ of candidates, or all candidates need to be monitored. A ratio of 0 is also possible, which means no candidate is monitored. The ratio may configured with other value. To ensure an integer quantity of resultant candidates, the quantity may be rounded up or rounded down. On the other hand, the value of the candidate of the search space to be monitored may also notify that only candidates of some aggregation levels among the candidates of the search space need to be monitored, for example, the aggregation levels are grouped, specifically, every two adjacent aggregation levels are formed into one group: {1,2}, {2,4}, {4,8}, {8,16}. If the indication signaling indicates that the first group is to be monitored, then only aggregation levels 1 and 2 need to be monitored currently. Optionally, the aggregation level to be monitored blindly may be directly indicated.

If the search space set is considered, a ratio of all search space sets such as ¼, ½ and 1 may be given; or the configured search space sets may be divided into different groups according to IDs, e.g., a group 1 corresponds to search space IDs 0 to 1, a group 2 corresponds to search space IDs 2 to 3, a group 3 corresponds to search space IDs 4 to 5, and so on. The configured quantity of groups and corresponding IDs may be configured at the higher layer.

As an optional embodiment, a value of the search space set to be monitored includes: an index of a group of search space sets to be monitored, and/or, an index of the search space set to be monitored; wherein the group of search space sets to be monitored includes at least two search space sets to be monitored.

Optionally, the index of the group of search space sets to be monitored is a group ID of the group of search space sets to be monitored, and the index of the search space set to be monitored is an ID of the search space set to be monitored.

Different search space sets may be configured with different monitoring periodicities. A greater periodicity means a lower control channel monitoring frequency, and a lesser periodicity means a higher control channel monitoring frequency. Each bandwidth part (BWP) of each UE can be configured with up to 10 search space sets. By configuring different monitoring periodicities for different search space sets and indicating the ID of the monitored search space set through indication signaling, a variation of control channel monitoring periodicity may be controlled dynamically. For example, IDs of four search space sets are configured as 1, 2, 3, 4 respectively, and corresponding monitoring periodicities are 1, 2, 5, 10 slots respectively. By indicating with the indication signaling that only a search space with an ID of 4 needs to be monitored in a certain time period after the signaling is received, the dynamic adjustment of the PDCCH monitoring periodicity is achieved, thus the control channel monitoring complexity is lowered. If UE needs to be scheduled frequently in a certain period of time, by indicating with the indication signaling that a search space with an ID of 1 or 2 needs to be monitored in a certain time period, a dynamic adaption to the UE service load is achieved. The quantity of search space ID indicated by the indication signaling may be one or more.

To lower the complexity of indication, the search space sets may be grouped according to ID, and different groups may correspond to different ranges of monitoring periodicities. By indicating the groups to be monitored, an adjustment of the control channel monitoring state is achieved. In the above example, different groups do not share an ID. In another implementation, different groups may share an ID. For example, IDs corresponding to a group 1 are {0,1,2,3}, IDs corresponding to a group 2 are {1,4,5,6}, and IDs corresponding to a group 3 are {1,7,8,9}. This manner is applicable to a scenario in which the monitoring of a certain search space set is invariable, while the transmission periodicity or frequency of other control information is adjusted dynamically, and thus different search space sets corresponding to different search space IDs may be configured accordingly to adapt to this adjustment of control information transmission frequency.

In some embodiments of the present disclosure, the indication of the search space set to be monitored (which is designated as Search Space in protocol 38.331, and designated as search space set in protocol 38.213) is achieved through an indication of a least periodicity value. For example, IDs of four search space sets are configured as 1, 2, 3, 4 respectively, and corresponding monitoring periodicities are 1, 2, 5, 10 slots respectively. If it is indicated that the least periodicity of search space to be monitored subsequently is 5, then only the search space sets 3 and 4 which have a periodicity greater than or equal to 5 need to be monitored. If it is indicated that the least periodicity of search space to be monitored subsequently is 1, then all four search space sets need to be monitored.

RNTI types may be discriminated, for example, for the same kind of search spaces, different RNTIs may be used discriminatively for scrambling. However, in general, the blind-monitor complexity as a result of different formats is insignificant for the same DCI length. Therefore, the RNTI type discrimination provides limited power saving effect.

Some or all combinations of the aforementioned information constitute different indication states of the third indication information. For example, the third indication information includes 3 bits. The contents included in the third indication information and corresponding values are shown in table 1.

TABLE 1

| Third indication information | Search space type | DCI format | Candidate |
|---|---|---|---|
| 000 | none | none | none |
| 001 | common search space | DCI format 0_0, 1_0, 2_2, 2_3 (bit counts of these formats are identical) | 1/2 |
| 010 | common search space | DCI format 2_0 | 1/2 (since format 2_0 has only 1 or 2 candidates, the value may not indicate the ratio of candidates) |
| 011 | common search space | all formats | 1 |
| 100 | UE specific search space | DCI format 0_0, 1_0 | 1/4 |
| 101 | UE specific search space | DCI format 0_1, 1_1 | 1/4 |
| 110 | UE specific search space | all formats | 1/2 |
| 111 | both common search space and UE specific search space | all formats | 1 |

Taking a value of 110 for example, the value indicates that UE only needs to monitor a UE specific search space. If the current slot corresponds right to a paging occasion, since the control information for a paging message belongs to common control information, the value shows that no control information for the paging message is transmitted currently, and the UE does not need to monitor the paging message to obtain the update status of the system message. The monitored DCI formats include all DCI formats, namely, DCI formats 0_0, 1_0, as well as DCI formats 0_1, 1_1. This value is applicable to a situation in which the UE is configured with multiple UE specific search spaces, since in the case of a certain search space, either DCI formats 0_0, 1_0 or DCI formats 0_1, 1_1 need to be monitored, and the simultaneous monitoring of DCI formats 0_0, 1_0 or DCI formats 0_1, 1_1 is only necessary in the case of multiple search spaces.

For the value of 101, since it indicates that only DCI formats 0_1, 1_1 need to be monitored, UE does not need to monitor those search spaces configured for monitoring the DCI formats 0_0, 1_0.

For the value of 000, it indicates that the UE currently does not need to monitor a control channel.

The specific table design provided herein is only exemplary. Configurations as to how many pieces of information are combined by the third indication information, which pieces of information are combined by the third indication information and the state partition for each information all can be made at a higher layer.

The third indication information may also indicate in a bit-wise manner according to the type of to-be-indicated information. For example, there are two kinds of currently indicated combinations, which include search space sets and ratios of candidates. Assuming that the search space sets are divided into 5 groups, then 5 bits are used, wherein each bit corresponds to one group and indicates which search space sets need to be monitored. In the meantime, the ratio of candidates needs to be indicated. Assuming that there are 4 ratios of candidates, then two indication manners may be used. One indication manner is to use two bits for each group of search space sets, and the other indication manner is to use two common bits for all search space sets.

The third indication information per se may be indicated for each UE individually, or may be a common indication.

For example, the current third indication information only indicates one kind of combination, i.e., the ratios of PDCCH candidates, and there are three ratio states, then two bits of indication information is needed.

When the common indication is adopted, the third indication information includes only two bits. UE which monitored the third indication information adheres to the same control channel monitoring state. When the individual indication for each UE is adopted, there are two implementations. One implementation is that each UE monitors its own third indication information, which incurs a greater overhead. The other implementation is that the third indication information for multiple UE are multiplexed in the same indication signaling, and each UE corresponds to different pieces of 2-bit information in the indication signaling.

In a fourth aspect, in a case that the indication signaling includes the fourth indication information, the fourth indication information may further be used to indicate a paging state in the RRC IDLE state. That is, similar to the role of WUS, the fourth indication information indicates to the UE whether a valid paging message is transmitted in the paging occasion. If no valid paging message is transmitted, the UE does not need to monitor the control channel scheduling the paging message, and may remain in a low power mode, thereby saving power. The difference from the WUS lies in the transmission resource. The WUS occupies the entire bandwidth and one or more subframes to transmit, while the transmission resource for the indication information herein is the target physical resource or the target downlink control channel.

Further, it is noted, the indication signaling is common indication signaling or UE specific indication signaling.

Specifically, one manner of transmitting indication signaling is to transmit common information, i.e., the content indicated by the signaling is the same for all UE; the other manner of transmitting indication signaling is to allot different bits in the signaling for the indication information of different UE, and the monitoring information may be different for different UE in this manner. A third manner is to indicate for each UE individually, which will incur a greater indication signaling overhead.

The indication signaling may indicate the control information to be monitored by the UE in one or more slots, or indicate wakeup or configuration information in one or more DRX cycles.

Optionally, in a case that the indication signaling is the common indication signaling, monitoring information for different UE corresponds to different bits or a same bit in the indication signaling.

In summary, the foregoing embodiment of the present disclosure provides a method for transmitting indication signaling, in which the UE DRX wakeup state and DRX parameter configuration are indicated dynamically, and information as to which control channel candidates need to be monitored and which control channel candidates do not need to be monitored are indicated dynamically, so as to reduce the number of times the UE monitors invalid PDCCH, thereby saving power in the connected state.

As shown in FIG. 5, an embodiment of the present disclosure further provides a method for receiving indication signaling. The method is applied to UE and includes step 51:

receiving indication signaling transmitted by a network side device on a target physical resource or a target downlink control channel, wherein the indication signaling includes monitoring information for at least one UE, and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

As an embodiment, when the indication signaling is carried by the target physical resource, the indication signaling adopts a simple encoding, and does not need to undergo Polar encoding as in the case of a control channel. For example, the indication signaling adopts a manner in which there is a direct mapping relationship between information bits and encoded bits (for example, the mapping relationship is listed in a table); for another example, the indication signaling adopts a manner in which an information bit is repeated or other manner with low code rate.

That is, the step 51 includes: receiving encoded indication signaling transmitted by the network side device on the target physical resource or the target downlink control channel; wherein the indication signaling is encoded by the network side device in a manner where a mapping relationship between information bits and encoded bits exists; and/or, the indication signaling is encoded by the network side device in a channel manner where an information bit is repeated or a code rate is low.

Further, the time domain OFDM symbol position of the target physical resource includes: a first orthogonal frequency division multiplexing (OFDM) symbol of a slot (that is, the target physical resource is mapped to the first OFDM symbol of a slot); and/or, an OFDM symbol where a control resource set (CORESET) for a downlink control channel is transmitted (that is, the target physical resource is mapped to the OFDM symbol where a CORESET for a downlink control channel is transmitted).

It is noted, the CORESET occupies up to three OFDM symbols in the time domain, and the time-domain starting position is determined by a search space configuration.

It is further noted, the target physical resource may be mapped to all OFDM symbols where the CORESET for a downlink control channel is transmitted, or the target physical resource may be mapped to some of the OFDM symbols where the CORESET for a downlink control channel is transmitted.

Specifically, in the foregoing embodiment of the present disclosure, the frequency domain resource mapping unit of the target physical resource is: a resource element group (REG) of the downlink control channel; or N resource blocks (RBs), wherein N is an integer greater than or equal to 1. Optionally, N is equal to 6. The frequency domain position of the target physical resource is allocated with a resource granularity of 6 RBs at the higher layer through multiple-bit indication. An advantage of taking 6 RBs as a mapping unit consists in that a compatibility with the resource allocation of control resource set (CORESET) is achieved, since the frequency domain resource allocation of CORESET is to indicate, in form of a bitmap, whether a resource group of 6 PRBs is allocated to the CORESET.

It is noted, frequency domain resource position of the target physical resource is determined by predefinition or by network side signaling configuration; and/or, a time domain OFDM symbol position of the target physical resource is determined by predefinition or by network side signaling configuration.

As another embodiment, in a case that the indication signaling is carried by the target downlink control channel, the target downlink control channel includes: a control channel carrying common control information and/or a control channel carrying UE specific control information.

Since the common control channel has fewer monitoring candidates and the positions of the candidates in the search space are determinate, the monitoring complexity of the common control channel is relatively low.

Further, in the foregoing embodiments of the present disclosure, the indication signaling is carried on the target physical resource or the target downlink control channel by means of a sequence. That is, the target physical resource or the target downlink control channel carries a sequence, and the indication signal is identified by the sequence. Indication signaling for different UE may be distinguished from each other by using different orthogonal codes, and transmitted on the same transmission resource.

It is noted, the indication signaling according to the foregoing embodiments of the present disclosure includes at least one of the first indication information, the second indication information, the third indication information and the fourth indication information.

In a first aspect, in a case that the indication signaling includes the first indication information, the activity state for the at least one subsequent DRX cycle indicated by the first indication information includes at least one of:

whether a drx-onDurationTimer is activated for the at least one subsequent DRX cycle in a case that a specified condition is met;

whether a downlink control channel is monitored in an active period for the at least one subsequent DRX cycle;

whether a downlink control channel (e.g., PDCCH) is monitored in an active period for the at least one subsequent DRX cycle;

the drx-onDurationTimer is activated for the at least one subsequent DRX cycle in the case that the specified condition is met; in other words, once the information is monitored, the UE needs to activate the drx-onDurationTimer, and if the information is not monitored, the UE does not need to activate the drx-onDurationTimer;

the downlink control channel (e.g., PDCCH) is monitored in the active period for the at least one subsequent DRX cycle; in other words, once the information is monitored, the UE needs to monitor the PDCCH, and if the information is not monitored, the UE does not need to monitor the PDCCH;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

In brief, the first indication information is used to indicate whether the PDCCH is to be monitored or whether the drx-onDurationTimer is to be activated for a subsequent period in which the drx-onDurationTimer is supposed to be activated. Speaking in a plainer manner, the first indication information is used to indicate whether UE needs to be woken up in an on duration stage. For example, if a certain state of the indication signaling represents that the UE does not need to be woken up to receive the PDCCH in a subsequent on duration stage, that is, no PDCCH is scheduled in the on duration stage, the UE may remain in the inactivity state, so as to achieve power saving effect.

For example, when the drx-ShortCycle is used, the first constraint relationship is to satisfy: [(SFN×10)+subframe number] modulo (drx-ShortCycle)=(drx-StartOffset) modulo (drx-ShortCycle); or when the drx-LongCycle is used, the second constraint relationship is to satisfy: [(SFN×10)+subframe number] modulo (drx-LongCycle)=drx-StartOffset. The drx-onDurationTimer is activated at a time position offset by the drx-SlotOffset from the starting position of the subframe satisfying the first constraint relationship or second constraint relationship.

By means of the first indication information, whether the drx-onDurationTimer is to be activated for subsequent time periods in which the drx-onDurationTimer is supposed to be activated can be indicated, or whether the PDCCH is to be monitored in the subsequent active period can be indicated.

The aforementioned active period forcludes the active period described in 3GPP TS 38.321. When DRX is configured, the active period forcludes the following:

a period in which drx-onDurationTimer, drx-InactivityTimer, drx-RetransmissionTimerDL, drx-RetransmissionTimerUL or ra-ContentionResolutionTimer is running; or a period in which an uplink scheduling request (SR) is transmitted on the PUCCH and a response is not yet received (in a pending stage); or a period in which a random access response is received successfully, wherein a random access sequence corresponding to the random access response is not selected by a medium access control (MAC) entity from contention-based random access sequences, but a PDCCH corresponding to the cell radio network temporary identifier (C-RNTI) of the MAC entity and indicating new data transmission is not yet received.

In a second aspect, in a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

In brief, there are two indication manners for the DRX parameter configuration as follows:

the higher layer signaling configures multiple DRX parameter configurations, and each parameter configuration has part of its parameters varied from the remaining parameter configurations. The second indication information indicates one of the parameter configurations as the parameter configuration to be used in the immediate wakeup stage, so as to achieve the dynamic adjustment of DRX parameter configuration;

the higher layer signaling configures one DRX parameter configuration, and the signaling indicates a scaling factor for scaling the timer value or slot periodicity offset value in the DRX parameter configuration, to obtain the DRX parameter configuration applied to the current on duration wakeup stage.

For example, the scaling factor has a value such as ⅛, ¼, ½, 1, 2, 4 or 8. For the timer value in the DRX parameter configuration, the scaling factor is multiplied with the timer value configured at the higher layer, and the result is compared with optional values in the timer value range to locate the maximum timer value, or a maximum optional value less than the multiplication result, or a minimum optional value greater than the multiplication result as the updated timer value.

For the scaling of long DRX cycle and short DRX cycle, the periodicity and offset value of the long DRX cycle are defined simultaneously, the periodicity and the offset value may undergo scaling first, then a rounding operation as described above may be performed thereon. The value of the short DRX cycle may be based on a proportion value k with respect to the long DRX cycle in the higher layer configuration, e.g., the long DRX cycle is k times the short DRX cycle. Thus, the value of short DRX cycle is obtained by directly dividing the scaled long DRX cycle value by k, wherein k is a predefined value.

It is noted, the DRX parameter configuration includes at least one of the following: drx-onDurationTimer, drx-InactivityTimer, drx-HARQ-RTT-TimerDL, drx-HARQ-RTT-TimerUL, drx-RetransmissionTimerDL, drx-RetransmissionTimerUL, drx-LongCycleStartOffset, shortDRX and drx-SlotOffset.

In a third aspect, in a case that the indication signaling includes the third indication information, the third indication information indicates the monitoring information of the downlink control channel to be monitored through a value of at least one of following information:

a type of a search space to be monitored;
a candidate of the search space to be monitored;
a search space set to be monitored;
a radio network temporary identifier (RNTI) type of the search space to be monitored;
a format of downlink control information to be monitored; and
a length of the downlink control information to be monitored.

The type of the search space to be monitored includes: a common search space and/or a UE specific search space.

The complexity of downlink control channel monitor originates from the fact that UE has to blindly monitor many control channel configurations simultaneously, e.g., many search space types, many control channel formats, many candidates, etc.

Accordingly, by means of the third indication information, these search space types, downlink control information (DCI) formats, candidates, or even search space sets, RNTI types for scrambling are combined and the corresponding values are indicated to UE, so that the UE may only perform the blind monitoring of some the control candidates according to the indication signaling and omits unnecessary monitor, thus UE monitor complexity is lowered.

A design of the third indication information incorporates different values of some or all of the aforementioned information. Here, the control channel monitor by a UE in a connected state is taken as an example. For the UE in the connected state, the system information is only read in a fixed occasion, and the modification of system message is indicated through a paging message. Thus, the system message monitor is ignored for the common search space. The monitor of the following may be considered: control channel for the paging message (transmitting control information scrambled with P-RNTI (Paging-RNTI)), random access response (RAR) (transmitting control information scrambled with RA-RNTI or TC-RNTI), and other type3 common control information used for slot format indicator (SFI), power control command, interrupted transmission indicator and the like.

The type of the search space includes: a common search space and a UE specific search space. That is, both the common search space and the UE specific search space are to be monitored.

The format of downlink control information, i.e., DCI format, includes: DCI formats 0_0, 1_0, 2_0, 2_1, 2_2 and 2_3 for common search space, and DCI formats 0_1, 1_1, 0_0 and 1_0 for UE specific search space.

These formats may further be grouped according to DCI lengths of the formats, and formats in the same group are indicated by one state. For example, since the DCI formats 0_0, 1_0, 2_2, 2_3 for common search space have the same DCI length, the formats may be combined to be indicated by the same state. In this case, if the state is indicated, then according to the search space configuration, if the search space monitoring positions according to these formats, namely, monitoring occasions, occur in the same slot, the UE may need to blindly monitor the multiple DCI formats simultaneously.

As an optional embodiment, the value of the candidate of the search space to be monitored includes at least one of: a ratio value of candidates of the search space to be monitored, an aggregation level of candidates of the search space to be monitored, and an identifier of an aggregation level group of candidates of the search space to be monitored; wherein the aggregation level group of the candidates of the search space to be monitored includes: at least two aggregation levels of the candidates of the search space to be monitored.

For example, the ratio value of candidates of the search space may be a ratio of candidates configured in the search space, such as ¼, ½ or 1, that is, only first ¼ of candidates, only ½ of candidates, or all candidates need to be monitored. A ratio of 0 is also possible, which means no candidate is monitored. The ratio may configured with other value. To ensure an integer quantity of resultant candidates, the quantity may be rounded up or rounded down. On the other hand, the value of the candidate of the search space to be monitored may also notify that only candidates of some aggregation levels among the candidates of the search space need to be monitored, for example, the aggregation levels are grouped, specifically, every two adjacent aggregation levels are formed into one group: {1,2}, {2,4}, {4,8}, {8,16}. If the indication signaling indicates that the first group is to be monitored, then only aggregation levels 1 and 2 need to be monitored currently. Optionally, the aggregation level to be monitored blindly may be directly indicated.

If the search space set is considered, a ratio of all search space sets such as ¼, ½ and 1 may be given; or the configured search space sets may be divided into different groups according to IDs, e.g., a group 1 corresponds to search space IDs 0 to 1, a group 2 corresponds to search space IDs 2 to 3, a group 3 corresponds to search space IDs 4 to 5, and so on. The configured quantity of groups and corresponding IDs may be configured at the higher layer.

As an optional embodiment, a value of the search space set to be monitored includes: an index of a group of search space sets to be monitored, and/or, an index of the search space set to be monitored; wherein the group of search space sets to be monitored includes at least two search space sets to be monitored.

Optionally, the index of the group of search space sets to be monitored is a group ID of the group of search space sets to be monitored, and the index of the search space set to be monitored is an ID of the search space set to be monitored.

Different search space sets may be configured with different monitoring periodicities. A greater periodicity means a lower control channel monitoring frequency, and a lesser periodicity means a higher control channel monitoring frequency. Each bandwidth part (BWP) of each UE can be configured with up to 10 search space sets. By configuring different monitoring periodicities for different search space sets and indicating the ID of the monitored search space set through indication signaling, a variation of control channel monitoring periodicity may be controlled dynamically. For example, IDs of four search space sets are configured as 1, 2, 3, 4 respectively, and corresponding monitoring periodicities are 1, 2, 5, 10 slots respectively. By indicating with the indication signaling that only a search space with an ID of 4 needs to be monitored in a certain time period after the signaling is received, the dynamic adjustment of the PDCCH monitoring periodicity is achieved, thus the control channel monitoring complexity is lowered. If UE needs to be scheduled frequently in a certain period of time, by indicating with the indication signaling that a search space with an ID of 1 or 2 needs to be monitored in a certain time period, a dynamic adaption to the UE service load is achieved. The quantity of search space ID indicated by the indication signaling may be one or more.

To lower the complexity of indication, the search space sets may be grouped according to ID, and different groups may correspond to different ranges of monitoring periodicities. By indicating the groups to be monitored, an adjustment of the control channel monitoring state is achieved. In the above example, different groups do not share an ID. In another implementation, different groups may share an ID. For example, IDs corresponding to a group 1 are {0,1,2,3}, IDs corresponding to a group 2 are {1,4,5,6}, and IDs corresponding to a group 3 are {1,7,8,9}. This manner is applicable to a scenario in which the monitoring of a certain search space set is invariable, while the transmission periodicity or frequency of other control information is adjusted dynamically, and thus different search space sets corresponding to different search space IDs may be configured accordingly to adapt to this adjustment of control information transmission frequency.

In some embodiments of the present disclosure, the indication of the search space set to be monitored (which is designated as Search Space in protocol 38.331, and designated as search space set in protocol 38.213) is achieved through an indication of a least periodicity value. For example, IDs of four search space sets are configured as 1, 2, 3, 4 respectively, and corresponding monitoring periodicities are 1, 2, 5, 10 slots respectively. If it is indicated that the least periodicity of search space to be monitored subsequently is 5, then only the search space sets 3 and 4 which have a periodicity greater than or equal to 5 need to be monitored. If it is indicated that the least periodicity of search space to be monitored subsequently is 1, then all four search space sets need to be monitored.

RNTI types may be discriminated, for example, for the same kind of search spaces, different RNTIs may be used discriminatively for scrambling. However, in general, the blind-monitor complexity as a result of different formats is insignificant for the same DCI length. Therefore, the RNTI type discrimination provides limited power saving effect.

The third indication information may also indicate in a bit-wise manner according to the type of to-be-indicated information. For example, there are two kinds of currently indicated combinations, which include search space sets and ratios of candidates. Assuming that the search space sets are divided into 5 groups, then 5 bits are used, wherein each bit corresponds to one group and indicates which search space sets need to be monitored. In the meantime, the ratio of candidates needs to be indicated. Assuming that there are 4 ratios of candidates, then two indication manners may be used. One indication manner is to use two bits for each group of search space sets, and the other indication manner is to use two common bits for all search space sets.

The third indication information per se may be indicated for each UE individually, or may be a common indication. For example, the current third indication information only indicates one kind of combination, i.e., the ratios of PDCCH candidates, and there are three ratio states, then two bits of indication information is needed.

When the common indication is adopted, the third indication information includes only two bits. UE which monitored the third indication information adheres to the same control channel monitoring state. When the individual indication for each UE is adopted, there are two implementations. One implementation is that each UE monitors its own third indication information, which incurs a greater overhead. The other implementation is that the third indication information for multiple UE are multiplexed in the same indication signaling, and each UE corresponds to different pieces of 2-bit information in the indication signaling.

In a fourth aspect, in a case that the indication signaling includes the fourth indication information, the fourth indication information may further be used to indicate a paging state in the RRC IDLE state. That is, similar to the role of WUS, the fourth indication information indicates to the UE whether a valid paging message is transmitted in the paging occasion. If no valid paging message is transmitted, the UE does not need to monitor the control channel scheduling the paging message, and may remain in a low power mode, thereby saving power. The difference from the WUS lies in the transmission resource. The WUS occupies the entire bandwidth and one or more subframes to transmit, while the transmission resource for the indication information herein is the target physical resource or the target downlink control channel.

Further, it is noted, the indication signaling is common indication signaling or UE specific indication signaling.

Specifically, one manner of transmitting indication signaling is to transmit common information, i.e., the content indicated by the signaling is the same for all UE; the other manner of transmitting indication signaling is to allot different bits in the signaling for the indication information of different UE, and the monitoring information may be different for different UE in this manner. A third manner is to indicate for each UE individually, which will incur a greater indication signaling overhead.

The indication signaling may indicate the control information to be monitored by the UE in one or more slots, or indicate wakeup or configuration information in one or more DRX cycles.

Optionally, in a case that the indication signaling is the common indication signaling, monitoring information for different UE corresponds to different bits or a same bit in the indication signaling.

In summary, the foregoing embodiment of the present disclosure provides a method for receiving indication signaling, in which the UE DRX wakeup state and DRX parameter configuration are indicated dynamically, and information as to which control channel candidates need to be monitored and which control channel candidates do not need to be monitored are indicated dynamically, so as to reduce the number of times the UE monitors invalid PDCCH, thereby saving power in the connected state.

As shown in FIG. 6, an embodiment of the present disclosure further provides an apparatus for transmitting indication signaling. The apparatus is applied to a network side device and includes:

a transmission module 61, configured to transmit indication signaling on a target physical resource or a target downlink control channel, wherein the indication signaling includes monitoring information for at least one user equipment (UE), and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

Optionally, in the foregoing embodiment of the present disclosure, the target physical resource includes: a first orthogonal frequency division multiplexing (OFDM) symbol of a slot; and/or, an OFDM symbol where a control resource set (CORESET) for a downlink control channel is transmitted.

Optionally, in the foregoing embodiment of the present disclosure, the target downlink control channel includes: a control channel carrying common control information and/or a control channel carrying UE specific control information.

Optionally, in the foregoing embodiment of the present disclosure, the transmission module includes:

an encoding submodule, configured to encode the indication signaling in a manner where a mapping relationship between information bits and encoded bits exists; and/or, encoding the indication signaling in a channel manner where an information bit is repeated or a code rate is low;

a transmission submodule, configured to transmit the encoded indication signaling on the target physical resource or the target downlink control channel.

Optionally, in the foregoing embodiment of the present disclosure, the indication signaling is carried on the target physical resource or the target downlink control channel by means of a sequence.

Optionally, in the foregoing embodiment of the present disclosure, a frequency domain resource mapping unit of the target physical resource is: a resource element group (REG) of the downlink control channel; or, N resource blocks (RBs), wherein N is an integer greater than or equal to 1.

Optionally, in the foregoing embodiment of the present disclosure, a frequency domain resource position of the target physical resource is determined by predefinition or by network side signaling configuration; and/or, a time domain OFDM symbol position of the target physical resource is determined by predefinition or by network side signaling configuration.

Optionally, in the foregoing embodiment of the present disclosure, in a case that the indication signaling includes the first indication information, the activity state for the at least one subsequent DRX cycle indicated by the first indication information includes at least one of:

whether a drx-onDurationTimer is activated for the at least one subsequent DRX cycle in a case that a specified condition is met;

whether a downlink control channel is monitored in an active period for the at least one subsequent DRX cycle;

the drx-onDurationTimer is activated for the at least one subsequent DRX cycle in the case that the specified condition is met;

the downlink control channel is monitored in the active period for the at least one subsequent DRX cycle;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

Optionally, in the foregoing embodiment of the present disclosure, in a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

Optionally, in the foregoing embodiment of the present disclosure, in a case that the indication signaling includes the third indication information, the third indication information indicates the monitoring information of the downlink control channel to be monitored through a value of at least one of following information:

a type of a search space to be monitored;
a candidate of the search space to be monitored;
a search space set to be monitored;
a radio network temporary identifier (RNTI) type of the search space to be monitored;
a format of downlink control information to be monitored; and
a length of the downlink control information to be monitored.

Optionally, in the foregoing embodiment of the present disclosure, the type of the search space to be monitored includes: a common search space and/or a UE specific search space.

Optionally, in the foregoing embodiment of the present disclosure, a value of the search space set to be monitored includes: an index of a group of search space sets to be monitored, and/or, an index of the search space set to be monitored; wherein the group of search space sets to be monitored includes at least two search space sets to be monitored.

Optionally, in the foregoing embodiment of the present disclosure, a value of the candidate of the search space to be monitored includes at least one of: a ratio value of candidates of the search space to be monitored, an aggregation level of candidates of the search space to be monitored, and an identifier of an aggregation level group of candidates of the search space to be monitored; wherein the aggregation level group of the candidates of the search space to be monitored includes: at least two aggregation levels of the candidates of the search space to be monitored.

Optionally, in the foregoing embodiment of the present disclosure, the indication signaling is common indication signaling or UE specific indication signaling.

Optionally, in the foregoing embodiment of the present disclosure, in a case that the indication signaling is the common indication signaling, monitoring information for different UE corresponds to different bits or a same bit in the indication signaling.

In the apparatus for transmitting indication signaling according to the embodiment of the present disclosure, the apparatus indicates dynamically monitoring information for UE on the target physical resource or the target downlink control channel, such that the UE may monitor the downlink control channel according to the corresponding monitoring information, to achieve the objective of power saving.

It is noted, the apparatus for transmitting indication signaling according to the embodiment of the present disclosure is an apparatus capable of implementing the foregoing method for transmitting indication signaling, and all embodiments of the method for transmitting indication signaling are applicable to the apparatus and may achieve the same or similar beneficial effects.

As shown in FIG. 7, an embodiment of the present disclosure further provides a network side device including a processor 700 and a transceiver 710. The processor 700 is configured to control the transceiver 710 to implement the following process:

transmitting indication signaling on a target physical resource or a target downlink control channel, wherein the indication signaling includes monitoring information for at least one user equipment (UE), and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

Optionally, in the foregoing embodiment of the present disclosure, the target physical resource includes: a first orthogonal frequency division multiplexing (OFDM) symbol of a slot; and/or, an OFDM symbol where a control resource set (CORESET) for a downlink control channel is transmitted.

Optionally, in the foregoing embodiment of the present disclosure, the target downlink control channel includes: a control channel carrying common control information and/or a control channel carrying UE specific control information.

Optionally, in the foregoing embodiment of the present disclosure, the processor 700 is further configured to:

encode the indication signaling in a manner where a mapping relationship between information bits and encoded bits exists; and/or, encode the indication signaling in a channel manner where an information bit is repeated or a code rate is low;

the transceiver 710 is further configured to transmit the encoded indication signaling on the target physical resource or the target downlink control channel.

Optionally, in the foregoing embodiment of the present disclosure, the processor 700 is further configured to carry the indication signaling on the target physical resource or the target downlink control channel by means of a sequence.

Optionally, in the foregoing embodiment of the present disclosure, a frequency domain resource mapping unit of the target physical resource is: a resource element group (REG) of the downlink control channel; or, N resource blocks (RBs), wherein N is an integer greater than or equal to 1.

Optionally, in the foregoing embodiment of the present disclosure, a frequency domain resource position of the target physical resource is determined by predefinition or by network side signaling configuration; and/or, a time domain OFDM symbol position of the target physical resource is determined by predefinition or by network side signaling configuration.

Optionally, in the foregoing embodiment of the present disclosure, in a case that the indication signaling includes the first indication information, the activity state for the at least one subsequent DRX cycle indicated by the first indication information includes at least one of:

whether a drx-onDurationTimer is activated for the at least one subsequent DRX cycle in a case that a specified condition is met;

whether a downlink control channel is monitored in an active period for the at least one subsequent DRX cycle;

the drx-onDurationTimer is activated for the at least one subsequent DRX cycle in the case that the specified condition is met;

the downlink control channel is monitored in the active period for the at least one subsequent DRX cycle;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

Optionally, in the foregoing embodiment of the present disclosure, in a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

Optionally, in the foregoing embodiment of the present disclosure, in a case that the indication signaling includes the third indication information, the third indication information indicates the monitoring information of the downlink control channel to be monitored through a value of at least one of following information:

a type of a search space to be monitored;
a candidate of the search space to be monitored;
a search space set to be monitored;
a radio network temporary identifier (RNTI) type of the search space to be monitored;
a format of downlink control information to be monitored; and
a length of the downlink control information to be monitored.

Optionally, in the foregoing embodiment of the present disclosure, the type of the search space to be monitored includes: a common search space and/or a UE specific search space.

Optionally, in the foregoing embodiment of the present disclosure, a value of the search space set to be monitored includes: an index of a group of search space sets to be monitored, and/or, an index of the search space set to be monitored; wherein the group of search space sets to be monitored includes at least two search space sets to be monitored.

Optionally, in the foregoing embodiment of the present disclosure, a value of the candidate of the search space to be monitored includes at least one of: a ratio value of candidates of the search space to be monitored, an aggregation level of candidates of the search space to be monitored, and an identifier of an aggregation level group of candidates of the search space to be monitored; wherein the aggregation level group of the candidates of the search space to be monitored includes: at least two aggregation levels of the candidates of the search space to be monitored.

Optionally, in the foregoing embodiment of the present disclosure, the indication signaling is common indication signaling or UE specific indication signaling.

Optionally, in the foregoing embodiment of the present disclosure, in a case that the indication signaling is the common indication signaling, monitoring information for different UE corresponds to different bits or a same bit in the indication signaling.

In the network side device according to the embodiment of the present disclosure, the network side device indicates dynamically monitoring information for UE on the target physical resource or the target downlink control channel, such that the UE may monitor the downlink control channel according to the corresponding monitoring information, to achieve the objective of power saving.

It is noted, the network side device according to the embodiment of the present disclosure is a network side device capable of implementing the foregoing method for transmitting indication signaling, and all embodiments of the method for transmitting indication signaling are applicable to the network side device and may achieve the same or similar beneficial effects.

An embodiment of the present disclosure further provides a computer readable storage medium storing therein a computer program, wherein the computer program is configured to be executed by a processor, to implement various processes of the embodiments of the foregoing method for transmitting indication signaling, and may achieve the same technical effects. To avoid repetition, a detailed description is omitted herein. The computer readable storage medium includes, for example, a read-only memory (ROM), random access memory (RAM), magnetic disk, optic disc, or the like.

As shown in FIG. 8, an embodiment of the present disclosure further provides an apparatus for receiving indication signaling. The apparatus is applied to UE and includes:

a reception module 81, configured to receive indication signaling transmitted by a network side device on a target physical resource or a target downlink control channel, wherein the indication signaling includes monitoring information for at least one UE, and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

Optionally, in the foregoing embodiment of the present disclosure, the target physical resource includes: a first orthogonal frequency division multiplexing (OFDM) symbol of a slot; and/or, an OFDM symbol where a control resource set (CORESET) for a downlink control channel is transmitted.

Optionally, in the foregoing embodiment of the present disclosure, the target downlink control channel includes: a control channel carrying common control information and/or a control channel carrying UE specific control information.

Optionally, in the foregoing embodiment of the present disclosure, the reception module includes:

a reception submodule, configured to receive encoded indication signaling transmitted by the network side device on the target physical resource or the target downlink control channel; wherein the indication signaling is encoded by the network side device in a manner where a mapping relationship between information bits and encoded bits exists; and/or, the indication signaling is encoded by the network side device in a channel manner where an information bit is repeated or a code rate is low.

Optionally, in the foregoing embodiment of the present disclosure, the indication signaling is carried on the target physical resource or the target downlink control channel by means of a sequence.

Optionally, in the foregoing embodiment of the present disclosure, a frequency domain resource mapping unit of the target physical resource is: a resource element group (REG) of the downlink control channel; or, N resource blocks (RBs), wherein N is an integer greater than or equal to 1.

Optionally, in the foregoing embodiment of the present disclosure, a frequency domain resource position of the target physical resource is determined by predefinition or by network side signaling configuration; and/or, a time domain OFDM symbol position of the target physical resource is determined by predefinition or by network side signaling configuration.

Optionally, in the foregoing embodiment of the present disclosure, in a case that the indication signaling includes the first indication information, the activity state for the at least one subsequent DRX cycle indicated by the first indication information includes at least one of:

whether a drx-onDurationTimer is activated for the at least one subsequent DRX cycle in a case that a specified condition is met;

whether a downlink control channel is monitored in an active period for the at least one subsequent DRX cycle;

the drx-onDurationTimer is activated for the at least one subsequent DRX cycle in the case that the specified condition is met;

the downlink control channel is monitored in the active period for the at least one subsequent DRX cycle;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

Optionally, in the foregoing embodiment of the present disclosure, in a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

Optionally, in the foregoing embodiment of the present disclosure, in a case that the indication signaling includes the third indication information, the third indication information indicates the monitoring information of the downlink control channel to be monitored through a value of at least one of following information:

a type of a search space to be monitored;
a candidate of the search space to be monitored;
a search space set to be monitored;
a radio network temporary identifier (RNTI) type of the search space to be monitored;
a format of downlink control information to be monitored; and
a length of the downlink control information to be monitored.

Optionally, in the foregoing embodiment of the present disclosure, the type of the search space to be monitored includes: a common search space and/or a UE specific search space.

Optionally, in the foregoing embodiment of the present disclosure, a value of the search space set to be monitored includes: an index of a group of search space sets to be monitored, and/or, an index of the search space set to be monitored; wherein the group of search space sets to be monitored includes at least two search space sets to be monitored.

Optionally, in the foregoing embodiment of the present disclosure, a value of the candidate of the search space to be monitored includes at least one of: a ratio value of candidates of the search space to be monitored, an aggregation level of candidates of the search space to be monitored, and an identifier of an aggregation level group of candidates of the search space to be monitored; wherein the aggregation level group of the candidates of the search space to be monitored includes: at least two aggregation levels of the candidates of the search space to be monitored.

Optionally, in the foregoing embodiment of the present disclosure, the indication signaling is common indication signaling or UE specific indication signaling.

Optionally, in the foregoing embodiment of the present disclosure, in a case that the indication signaling is the common indication signaling, monitoring information for different UE corresponds to different bits or a same bit in the indication signaling.

In the apparatus for receiving indication signaling according to the embodiment of the present disclosure, the network side device indicates dynamically monitoring information for UE on the target physical resource or the target downlink control channel, such that the UE may monitor the downlink control channel according to the corresponding monitoring information, to achieve the objective of power saving.

It is noted, the apparatus for receiving indication signaling according to the embodiment of the present disclosure is an apparatus capable of implementing the foregoing method for receiving indication signaling, and all embodiments of the method for receiving indication signaling are applicable to the apparatus and may achieve the same or similar beneficial effects.

Figure 9:
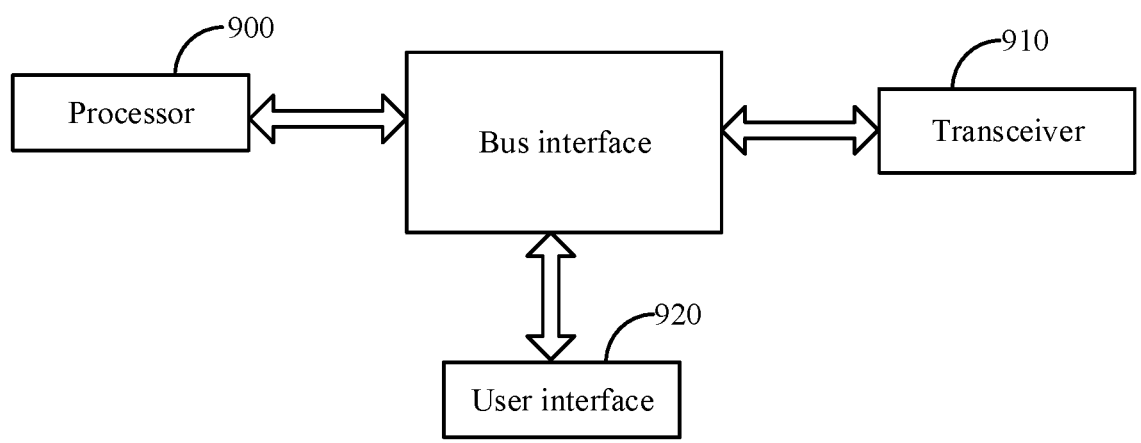
FIG. 9 is a schematic structural diagram of UE according to an embodiment of the present disclosure.

As shown in FIG. 9, an embodiment of the present disclosure further provides UE including a processor 900 and a transceiver 910. The UE further includes a user interface 920. The processor 900 is configured to control the transceiver 910 to implement the following process:

receiving indication signaling transmitted by a network side device on a target physical resource or a target downlink control channel, wherein the indication signaling includes monitoring information for at least one UE, and the monitoring information includes at least one of:

first indication information, used to indicate an activity state for at least one subsequent discontinuous reception (DRX) cycle;

second indication information, used to indicate a DRX parameter configuration for the at least one subsequent DRX cycle;

third indication information, used to indicate monitoring information of a downlink control channel to be monitored;

fourth indication information, used to indicate a monitoring state in at least one subsequent paging occasion.

Optionally, in the foregoing embodiment of the present disclosure, the target physical resource includes: a first orthogonal frequency division multiplexing (OFDM) symbol of a slot; and/or, an OFDM symbol where a control resource set (CORESET) for a downlink control channel is transmitted.

Optionally, in the foregoing embodiment of the present disclosure, the target downlink control channel includes: a control channel carrying common control information and/or a control channel carrying UE specific control information.

Optionally, in the foregoing embodiment of the present disclosure, the transceiver 900 is further configured to:

receive encoded indication signaling transmitted by the network side device on the target physical resource or the target downlink control channel;

wherein the indication signaling is encoded by the network side device in a manner where a mapping relationship between information bits and encoded bits exists; and/or, the indication signaling is encoded by the network side device in a channel manner where an information bit is repeated or a code rate is low.

Optionally, in the foregoing embodiment of the present disclosure, the indication signaling is carried on the target physical resource or the target downlink control channel by means of a sequence.

Optionally, in the foregoing embodiment of the present disclosure, a frequency domain resource mapping unit of the target physical resource is: a resource element group (REG) of the downlink control channel; or, N resource blocks (RBs), wherein N is an integer greater than or equal to 1.

Optionally, in the foregoing embodiment of the present disclosure, a frequency domain resource position of the target physical resource is determined by predefinition or by network side signaling configuration; and/or, a time domain OFDM symbol position of the target physical resource is determined by predefinition or by network side signaling configuration.

Optionally, in the foregoing embodiment of the present disclosure, in a case that the indication signaling includes the first indication information, the activity state for the at least one subsequent DRX cycle indicated by the first indication information includes at least one of:

whether a drx-onDurationTimer is activated for the at least one subsequent DRX cycle in a case that a specified condition is met;

whether a downlink control channel is monitored in an active period for the at least one subsequent DRX cycle;

the drx-onDurationTimer is activated for the at least one subsequent DRX cycle in the case that the specified condition is met;

the downlink control channel is monitored in the active period for the at least one subsequent DRX cycle;

wherein the specified condition includes at least one of:

for a drx-ShortCycle, a time position after a time offset represented by a drx-SlotOffset parameter from a beginning of a subframe satisfying a first constraint relationship;

for a drx-LongCycle, a time position after a time offset represented by a drx-SlotOffset parameter from a beginning of a subframe satisfying a second constraint relationship.

Optionally, in the foregoing embodiment of the present disclosure, in a case that the indication signaling includes the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor.

Optionally, in the foregoing embodiment of the present disclosure, in a case that the indication signaling includes the third indication information, the third indication information indicates the monitoring information of the downlink control channel to be monitored through a value of at least one of following information:

a type of a search space to be monitored;

a candidate of the search space to be monitored;

a search space set to be monitored;

a radio network temporary identifier (RNTI) type of the search space to be monitored;

a format of downlink control information to be monitored; and a length of the downlink control information to be monitored.

Optionally, in the foregoing embodiment of the present disclosure, the type of the search space to be monitored includes: a common search space and/or a UE specific search space.

Optionally, in the foregoing embodiment of the present disclosure, a value of the search space set to be monitored includes: an index of a group of search space sets to be monitored, and/or, an index of the search space set to be monitored; wherein the group of search space sets to be monitored includes at least two search space sets to be monitored.

Optionally, in the foregoing embodiment of the present disclosure, a value of the candidate of the search space to be monitored includes at least one of: a ratio value of candidates of the search space to be monitored, an aggregation level of candidates of the search space to be monitored, and an identifier of an aggregation level group of candidates of the search space to be monitored; wherein the aggregation level group of the candidates of the search space to be monitored includes: at least two aggregation levels of the candidates of the search space to be monitored.

Optionally, in the foregoing embodiment of the present disclosure, the indication signaling is common indication signaling or UE specific indication signaling.

Optionally, in the foregoing embodiment of the present disclosure, in a case that the indication signaling is the common indication signaling, monitoring information for different UE corresponds to different bits or a same bit in the indication signaling.

In the UE according to the embodiment of the present disclosure, the network side device indicates dynamically monitoring information for UE on the target physical resource or the target downlink control channel, such that the UE may monitor the downlink control channel according to the corresponding monitoring information, to achieve the objective of power saving.

It is noted, the UE according to the embodiment of the present disclosure is UE capable of implementing the foregoing method for receiving indication signaling, and all embodiments of the method for receiving indication signaling are applicable to the network side device and may achieve the same or similar beneficial effects.

An embodiment of the present disclosure further provides a computer readable storage medium storing therein a computer program, wherein the computer program is configured to be executed by a processor, to implement various processes of the embodiments of the foregoing method for receiving indication signaling, and may achieve the same technical effects. To avoid repetition, a detailed description is omitted herein. The computer readable storage medium includes, for example, a read-only memory (ROM), random access memory (RAM), magnetic disk, optic disc or the like.

It is appreciated by a person skilled in the art that, embodiments of the present disclosure may be implemented as a method, system or computer program product. Therefore, embodiments of the present disclosure may take the form of a complete hardware embodiment, complete software embodiment or combination of hardware and software. Moreover, embodiments of the present disclosure may take the form of a computer program product embodied as one or more computer readable storage media (including, but not limited to, a magnetic disk storage, an optical storage or the like) storing therein computer usable program codes.

The embodiments of the present disclosure have been described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing device to produce a machine, such that the instructions, which are executed via the processor of the computer or other programmable data processing device, create means for implementing the functions specified in the flow diagram flow or flows and/or block diagram block or blocks.

These computer program instructions may also be stored in a computer-readable storage that can direct a computer or other programmable data processing device to function in a particular manner, such that the instructions stored in the computer-readable storage produce an article of manufacture including instruction means which implement the function specified in the flow diagram flow or flows and/or block diagram block or blocks.

The computer program instructions may also be loaded onto a computer or other programmable data processing device to cause a series of operational steps to be performed on the computer or other programmable device to produce a computer-implemented process such that the instructions which are executed on the computer or other programmable device provide steps for implementing the functions specified in the flow diagram flow or flows and/or block diagram block or blocks.

The above descriptions merely describe optional implementations of the present disclosure. It is appreciated, modifications and improvements may be made by a person of ordinary skill in the art without departing from the principle of the present disclosure, and these modifications and improvements shall be deemed as falling within the scope of the present disclosure as well.

What is claimed is:

1. A method for transmitting indication signaling, applied to a network side device, comprising:
  transmitting indication signaling on a target physical resource or a downlink control channel, wherein the indication signaling comprises at least one of the following information for at least one UE:
  first indication information, used to indicate an activity state for at least one subsequent discontinuous reception (DRX) cycle;
  second indication information, used to indicate a DRX parameter configuration for the at least one subsequent DRX cycle;
  third indication information, used to indicate a downlink control channel to be monitored;
  fourth indication information, used to indicate a monitoring state in at least one subsequent paging occasion;
  wherein, in a case that the indication signaling comprises the first indication information,
  the activity state for the at least one subsequent DRX cycle indicated by the first indication information comprises at least one of:
  whether a drx-onDurationTimer is activated for the at least one subsequent DRX cycle at a time position;
  whether a downlink control channel is monitored in an active period for the at least one subsequent DRX cycle;
  the drx-onDurationTimer is activated for the at least one subsequent DRX cycle at the time position;
  the downlink control channel is monitored in the active period for the at least one subsequent DRX cycle;
  wherein the time position comprises at least one of:
  for a drx-ShortCycle, a time position after a time offset represented by a drx-SlotOffset parameter from a beginning of a subframe satisfying a first constraint relationship;
  for a drx-LongCycle, a time position after a time offset represented by a drx-SlotOffset parameter from a beginning of a subframe satisfying a second constraint relationship;
  wherein, in a case that the indication signaling comprises the second indication information,
  in a case that higher layer signaling configures multiple DRX parameter configurations, the second indication information indicates one of the multiple DRX parameter configurations configured by the higher layer signaling as a DRX parameter configuration for a DRX cycle;
  in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor;
  wherein, in a case that the indication signaling comprises the third indication information, the third indication information indicates the downlink control channel to be monitored through at least one of following information:
  a type of a search space to be monitored;
  a candidate of the search space to be monitored;
  an index of a group of search space sets to be monitored;
  an index of the search space set to be monitored;
  a radio network temporary identifier (RNTI) type of the search space to be monitored;
  a format of downlink control information to be monitored; and
  a length of the downlink control information to be monitored.

2. The method according to claim 1, wherein the target physical resource comprises:
  a first orthogonal frequency division multiplexing (OFDM) symbol of a slot; and/or,
  an OFDM symbol where a control resource set (CORESET) for a downlink control channel is transmitted.

3. The method according to claim 1, wherein the downlink control channel comprises:
  a control channel carrying common control information and/or a control channel carrying UE specific control information.

4. A method for receiving indication signaling, applied to user equipment (UE), comprising:
  receiving indication signaling transmitted by a network side device on a target physical resource or a downlink control channel, wherein the indication signaling comprises at least one of the following information for at least one UE:
  first indication information, used to indicate an activity state for at least one subsequent discontinuous reception (DRX) cycle;
  second indication information, used to indicate a DRX parameter configuration for the at least one subsequent DRX cycle;
  third indication information, used to indicate a downlink control channel to be monitored;
  fourth indication information, used to indicate a monitoring state in at least one subsequent paging occasion;
  wherein, in a case that the indication signaling comprises the first indication information,
  the activity state for the at least one subsequent DRX cycle indicated by the first indication information comprises at least one of:
  whether a drx-onDurationTimer is activated for the at least one subsequent DRX cycle at a time position;
  whether a downlink control channel is monitored in an active period for the at least one subsequent DRX cycle;
  the drx-onDurationTimer is activated for the at least one subsequent DRX cycle at the time position;
  the downlink control channel is monitored in the active period for the at least one subsequent DRX cycle;
  wherein the time position comprises at least one of:
  for a drx-ShortCycle, a time position after a time offset represented by a drx-SlotOffset parameter from a beginning of a subframe satisfying a first constraint relationship;
  for a drx-LongCycle, a time position after a time offset represented by a drx-SlotOffset parameter from a beginning of a subframe satisfying a second constraint relationship;

wherein, in a case that the indication signaling comprises the second indication information, in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor;

wherein, in a case that the indication signaling comprises the third indication information, the third indication information indicates the downlink control channel to be monitored through at least one of following information:

a type of a search space to be monitored;
a candidate of the search space to be monitored;
an index of a group of search space sets to be monitored;
an index of the search space set to be monitored;
a radio network temporary identifier (RNTI) type of the search space to be monitored;
a format of downlink control information to be monitored; and
a length of the downlink control information to be monitored.

5. The method according to claim 4, wherein the target physical resource comprises:
a first orthogonal frequency division multiplexing (OFDM) symbol of a slot; and/or,
an OFDM symbol where a control resource set (CORE-SET) for a downlink control channel is transmitted.

6. The method according to claim 5, wherein a frequency domain resource mapping unit of the target physical resource is:
a resource element group (REG) of the downlink control channel; or,
N resource blocks (RBs), wherein N is an integer greater than or equal to 1.

7. The method according to claim 4, wherein the downlink control channel comprises:
a control channel carrying common control information and/or a control channel carrying UE specific control information.

8. The method according to claim 4, wherein the receiving the indication signaling transmitted by the network side device on the target physical resource or the downlink control channel comprises:
receiving encoded indication signaling transmitted by the network side device on the target physical resource or the downlink control channel;
wherein the indication signaling is encoded by the network side device in a manner where a mapping relationship between information bits and encoded bits exists; and/or, the indication signaling is encoded by the network side device in a channel manner where an information bit is repeated or a code rate is low.

9. The method according to claim 4, wherein the indication signaling is carried on the target physical resource or the downlink control channel by means of a sequence.

10. The method according to claim 4, wherein a frequency domain resource position of the target physical resource is determined by predefinition or by network side signaling configuration; and/or, a time domain OFDM symbol position of the target physical resource is determined by predefinition or by network side signaling configuration.

11. The method according to claim 4, wherein the type of the search space to be monitored comprises:
a common search space and/or a UE specific search space.

12. The method according to claim 4, wherein the candidate of the search space to be monitored comprises at least one of: a ratio value of candidates of the search space to be monitored, an aggregation level of candidates of the search space to be monitored, and an identifier of an aggregation level group of candidates of the search space to be monitored.

13. The method according to claim 4, wherein the indication signaling is common indication signaling or UE specific indication signaling.

14. The method according to claim 13, wherein, in a case that the indication signaling is the common indication signaling, different UE corresponds to different bits or a same bit in the indication signaling.

15. A network side device, comprising a processor and a transceiver, wherein the processor is configured to control the transceiver to implement following process:
transmitting indication signaling on a target physical resource or a downlink control channel, wherein the indication signaling comprises at least one of the following information for at least one UE:
first indication information, used to indicate an activity state for at least one subsequent discontinuous reception (DRX) cycle;
second indication information, used to indicate a DRX parameter configuration for the at least one subsequent DRX cycle;
third indication information, used to indicate a downlink control channel to be monitored;
fourth indication information, used to indicate a monitoring state in at least one subsequent paging occasion;
wherein, in a case that the indication signaling comprises the first indication information,
the activity state for the at least one subsequent DRX cycle indicated by the first indication information comprises at least one of:
whether a drx-onDurationTimer is activated for the at least one subsequent DRX cycle at a time position;
whether a downlink control channel is monitored in an active period for the at least one subsequent DRX cycle;
the drx-onDurationTimer is activated for the at least one subsequent DRX cycle at the time position;
the downlink control channel is monitored in the active period for the at least one subsequent DRX cycle;
wherein the time position comprises at least one of:
for a drx-ShortCycle, a time position after a time offset represented by a drx-SlotOffset parameter from a beginning of a subframe satisfying a first constraint relationship;
for a drx-LongCycle, a time position after a time offset represented by a drx-SlotOffset parameter from a beginning of a subframe satisfying a second constraint relationship;
wherein, in a case that the indication signaling comprises the second indication information,
in a case that higher layer signaling configures multiple DRX parameter configurations, the second indication information indicates one of the multiple DRX parameter configurations configured by the higher layer signaling as a DRX parameter configuration for a DRX cycle;

in a case that higher layer signaling configures one DRX parameter configuration, the second indication information indicates a scaling factor, and the DRX parameter configuration for the DRX cycle is determined by the DRX parameter configuration configured by the higher layer signaling and the scaling factor;

wherein, in a case that the indication signaling comprises the third indication information, the third indication information indicates the downlink control channel to be monitored through at least one of following information:

a type of a search space to be monitored;
a candidate of the search space to be monitored;
an index of a group of search space sets to be monitored;
an index of the search space set to be monitored;
a radio network temporary identifier (RNTI) type of the search space to be monitored;
a format of downlink control information to be monitored; and
a length of the downlink control information to be monitored.

16. User equipment (UE), comprising a processor and a transceiver, wherein the processor is configured to control the transceiver to implement the method for receiving indication signaling according to claim 4.

* * * * *